United States Patent
Yin et al.

(10) Patent No.: US 10,091,819 B2
(45) Date of Patent: Oct. 2, 2018

(54) SYSTEMS AND METHODS FOR TIMESLOT STRUCTURE AND SYNCHRONIZATION IN LICENSED-ASSISTED ACCESS

(71) Applicant: Sharp Laboratories of America, Inc., Camas, WA (US)

(72) Inventors: Zhanping Yin, Vancouver, WA (US); Toshizo Nogami, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 16 days.

(21) Appl. No.: 15/152,953

(22) Filed: May 12, 2016

(65) Prior Publication Data

US 2016/0338104 A1    Nov. 17, 2016

Related U.S. Application Data

(60) Provisional application No. 62/161,851, filed on May 14, 2015.

(51) Int. Cl.
*H04W 74/08* (2009.01)
*H04W 72/04* (2009.01)
(Continued)

(52) U.S. Cl.
CPC ... *H04W 74/0816* (2013.01); *H04W 72/0446* (2013.01); *H04W 56/00* (2013.01); *H04W 74/04* (2013.01); *H04W 74/08* (2013.01); *H04W 74/0808* (2013.01); *H04W 74/0825* (2013.01); *H04W 88/08* (2013.01)

(58) Field of Classification Search
CPC . H04W 74/08; H04W 56/00; H04W 77/0816; H04W 72/0446; H04W 88/08; H04W 74/04; H04W 74/0808; H04W 74/0825
See application file for complete search history.

(56) References Cited

U.S. PATENT DOCUMENTS

| | | | |
|---|---|---|---|
| 8,730,990 B2 | 5/2014 | Ghosh et al. |
| 2014/0071959 A1 | 3/2014 | Ghosh et al. |

(Continued)

FOREIGN PATENT DOCUMENTS

| | | |
|---|---|---|
| EP | 2649744 | 10/2013 |
| EP | 2757850 | 7/2014 |

(Continued)

OTHER PUBLICATIONS

NTT Docomo, Inc, "3GPP TSG RAN WG1 Meeting #80bis published on Apr. 20-24, 2015," discussion on frame structure and LBT mechanism for LAA DL.*

(Continued)

*Primary Examiner* — Mewale Ambaye
(74) *Attorney, Agent, or Firm* — Austin Rapp

(57) ABSTRACT

An evolved NodeB (eNB) for transmitting signals in a Licensed-Assisted Access (LAA) serving cell is described. The eNB includes a processor and memory in electronic communication with the processor. Instructions stored in the memory are executable to perform carrier sensing at least in a minimum clear channel assessment (MCCA) slot. A subframe includes N baseline MCCA timeslots, where N is a positive integer. The MCCA slot includes one of the baseline MCCA timeslots.

18 Claims, 20 Drawing Sheets

(51) Int. Cl.
H04W 56/00 (2009.01)
H04W 74/04 (2009.01)
H04W 88/08 (2009.01)

(56) References Cited

U.S. PATENT DOCUMENTS

2014/0341018 A1* 11/2014 Bhushan .......... H04W 28/0289
    370/230
2016/0143014 A1* 5/2016 Mukherjee ........ H04W 74/0816
    370/330
2016/0309512 A1* 10/2016 Li ..................... H04W 74/0816

FOREIGN PATENT DOCUMENTS

| WO | 2012139278 | 10/2012 |
| WO | 2013126858 | 8/2013 |
| WO | 2013167557 | 11/2013 |
| WO | 2014111309 | 7/2014 |

OTHER PUBLICATIONS

Search Report and Written Opinion issued for International Application No. PCT/US2016/032491 dated Sep. 14, 2016.
Invitation to Pay Additional Fees issued for International Application No. PCT/US2016/032491 dated Jul. 21, 2016.
CATT, "Design of load-based LBT for LAA," 3GPP TSG RAN WG1 Meeting #80bis, R1-151356, Belgrade, Serbia, Apr. 19, 2015.
Sharp, "CCA slot structure and alignment in LAA channel access," 3GPP TSG RAN WG1 Meeting #81, R1-153057, Fukuoka, Japan, May 15, 2015.
CATT, "Design of Frame-based LBT for LAA," 3GPP TSG RAN WG1 Meeting #880bis, R1-151355, Apr. 20, 2015.
Ericsson, "Analysis of Frame Based LBT Protocols," 3GPP TSG RAN WG1 Meeting #80bis, R1-151847, Apr. 20, 2015.
Huawei, HiSilicon, "LB Schemes Design for LAA," 3GPP TSG RAN WG1 Meeting #80bis, R1-151298, Apr. 20, 2015.
CATT, CATR, "Frame Structure Considerations for LAA," 3GPP TSG RAN WG1 Meeting #80bis, R1-151357, Apr. 20, 2015.
Qualcomm Incorporated, "Adaptive Frame Structure and DL-UL Configuration for LAA," 3GPP TSG RAN WG1 #80bis, R1-151404, Apr. 20, 2015.
InterDigital Communications, "DL Transmission for LAA," 3GPP TSG-RAN WG1 Meeting #80bis, R1-151460, Apr. 20, 2015.
Kyocera, "LBT Design for LAA," 3GPP TSG RAN WG1 Meeting #80bis, R1-151461, Apr. 20, 2015.
Alcatel-Lucent Shanghai Bell, Alcatel-Lucent, "LBT and Frame Structure Design for DL-Only LAA," 3GPP TSG RAN WG1 Meeting #80bis, R1-151478, Apr. 20, 2015.
LG Electronics, "Sustained Unfairness Problem with LBT," 3GPP TSG RAN WG1 Meeting #80bis, R1-151517, Apr. 20, 2015.
Samsung, "Discussion on LBT for LAA DL," 3GPP TSG RAN WG1 Meeting #80bis, R1-151623, Apr. 20, 2015.
Sharp, "Considerations on LAA Channel Access," 3GPP TSG RAN WG1 Meeting #80bis, R1-151710, Apr. 20, 2015.
ZTE, "Further Considerations on Frame Structure Design for LAA," 3GPP TSG RAN WG1 Meeting #80bis, R1-151808, Apr. 20, 2015.
ZTE, "Discussion on LBT Design for LAA," 3GPP TSG RAN WG1 Meeting #80bis, R1-151809, Apr. 20, 2015.
Intel Corporation, "Updated LBT Design for LAA Downlink," 3GPP TSG RAN WG1 RAN1#80-bis, R1-151825, Apr. 20, 2015.
NTT DoCoMo, Inc., "Discussion on Frame Structure and LBT Mechamism for LAA DL," 3GPP TSG RAN WG1 Meeting #80bis, R1-151957, Apr. 20, 2015.
KDDI, "Discussion on LBT Parameter for LAA," 3GPP TSG RAN1 Meeting #80bis, R1-151970, Apr. 20, 2015.
Huawei et al., "WF on LBT Category 4 Design for LAA," 3GPP TSG RAN WG1 Meeting #80bis, R1-152383, Apr. 20, 2015.
Intel et al., "WF on Cat4 Channel Access Scheme," 3GPP TSG-RAN WG1 Meeting #80bis, R1-152413, Apr. 20, 2015.
3GPP TR 36.889 v0.4.0, "Study on Licensed-Assisted Access to Unlicensed Spectrum (Release 13)," Apr. 1, 2015.

* cited by examiner

SYSTEMS AND METHODS FOR TIMESLOT STRUCTURE AND SYNCHRONIZATION IN LICENSED-ASSISTED ACCESS

RELATED APPLICATIONS

This application is related to and claims priority from U.S. Provisional Patent Application No. 62/161,851, entitled "SYSTEMS AND METHODS FOR TIMESLOT STRUCTURE AND SYNCHRONIZATION IN LICENSED-ASSISTED ACCESS," filed on May 14, 2015, which is hereby incorporated by reference herein, in its entirety.

TECHNICAL FIELD

The present disclosure relates generally to communication systems. More specifically, the present disclosure relates to systems and methods for channel sensing assessment (CCA) timeslot structure and synchronization for licensed-assisted access (LAA).

BACKGROUND

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

DETAILED DESCRIPTION

Figure 1:
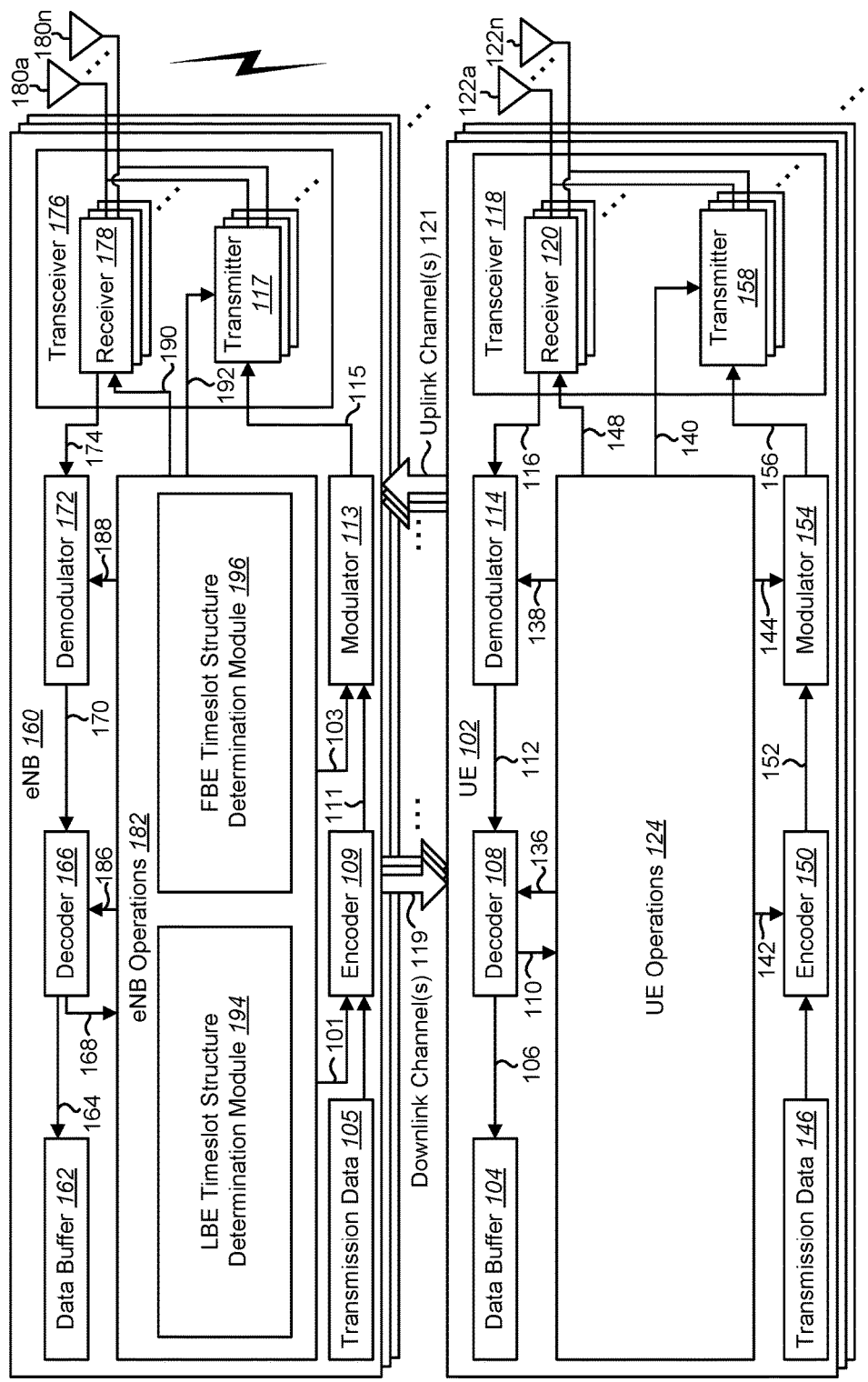
FIG. 1 is a block diagram illustrating one implementation of one or more evolved NodeBs (eNBs) and one or more user equipments (UEs) in which systems and methods for licensed-assisted access (LAA) may be implemented.

An evolved NodeB (eNB) for transmitting signals in a Licensed-Assisted Access (LAA) serving cell is described. The eNB includes a processor and memory in electronic communication with the processor. Instructions stored in the memory are executable to perform carrier sensing at least in a minimum clear channel assessment (MCCA) slot. A subframe includes N baseline MCCA timeslots, where N is a positive integer. The MCCA slot includes one of the baseline MCCA timeslots.

The instructions may be further executable to determine an actual defer period based on a pre-configured defer period length. A length of the actual defer period may be extended from a pre-configured defer period length. An extension length may be less than a length of one of the baseline MCCA timeslots.

The instructions may be further executable to determine an actual initial clear channel assessment (ICCA) slot based on a pre-configured ICCA length. A length of the actual ICCA slot may be extended from the pre-configured ICCA length. An extension length may be less than a length of one of the baseline MCCA timeslots.

Another eNB for transmitting signals in a Licensed-Assisted Access (LAA) serving cell is also described. The eNB includes a processor and memory in electronic communication with the processor. Instructions stored in the memory are executable to configure one or more unlicensed LAA cell from a licensed long term evolution (LTE) cell. The instructions are also executable to determine sizes for at least one of a minimum clear channel assessment (MCCA) slot, an initial clear channel assessment (ICCA) slot and a defer period. The instructions are further executable to determine a slot structure with a baseline MCCA slot of an unlicensed LAA cell. The instructions are additionally executable to align and adjust the length of at least one of the ICCA slot and the defer period of the LAA cell based on the baseline MCCA slot. The instructions are also executable to synchronize and align baseline MCCA slots of multiple LAA cells managed by the eNB.

The MCCA slot may be synchronized and may have a size that is a fraction of an orthogonal frequency division multiplexing (OFDM) symbol length. The slot structure of all LAA cells may be synchronized and aligned with the MCCA slot as a fraction of an OFDM symbol. The lengths of the ICCA slot and defer period may be multiples of the length of the MCCA slot. The length of the MCCA slot may be ⅛ of a Long Term Evolution (LTE) OFDM symbol, and the length of the ICCA slot may be ½ of an LTE OFDM symbol.

The length of the defer period may be the same as the ICCA slot. The length of the defer period may be at least the length of the ICCA slot, and may be calculated based on the access category of the packet or traffic to be transmitted.

The MCCA slot and ICCA slot size may be specified with a fixed length that cannot be divided by the length of an OFDM symbol. The slot structure of a LAA cell may be synchronized and aligned with the MCCA slot with a possible merged slot that is longer than the MCCA slot. The alignment may be performed from the end of an OFDM symbol boundary, and the possible merged slot may be located at the beginning of an OFDM symbol length. The alignment may be performed from the beginning of an OFDM symbol boundary, and the possible merged slot may be located at the end of an OFDM symbol length.

The alignment may be performed from the end of a subframe boundary, and the possible merged slot may be located at the beginning of a subframe length. The alignment may be performed from the beginning of a subframe boundary, and the possible merged slot may be located at the end of a subframe length.

An actual length of at least one of the ICCA slot and the defer period may be adjusted and expended according to the baseline MCCA slot structure.

A frame based equipment (FBE) access method may be configured for a LAA cell, and the ICCA slot may be used for listen-before-talk (LBT) before a subframe allowed for transmission. An FBE access method may be configured for a LAA cell, and the defer period may be used for LBT before a subframe allowed for transmission based on the access category of the pending packet or traffic.

Both load based equipment (LBE) and FBE access methods may be configured for the LAA cells. The ICCA slot used for LBT before a subframe allowed for transmission for a FBE LAA cell may be adjusted based on the CCA slot structure of LBE LAA cells.

Both LBE and FBE access methods may be configured for the LAA cells. The CCA slot structure of LBE LAA cells may be adjusted with the initial CCA slot used for LBT before a subframe allowed for transmission for a FBE LAA cell.

The CCA slot structure and alignment method may be specified or signaled to LAA UEs by higher layer signaling. The CCA slot structure and alignment method may be applied for LAA downlink transmissions. The CCA slot structure and alignment method may be applied for LAA uplink transmissions.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11 and/or 12). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may refer to any set of communication channels over which the protocols for communication between a UE and eNB that may be specified by standardization or governed by regulatory bodies to be used for International Mobile Telecommunications-Advanced (IMT-Advanced) or its extensions and all of it or a subset of it may be adopted by 3GPP as licensed bands (e.g., frequency bands) to be used for communication between an eNB and a UE. "Configured cells" are those cells of which the UE is aware and is allowed by an eNB to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the physical downlink control channel (PDCCH) and in the case of a downlink transmission, those cells for which the UE decodes a physical downlink shared channel (PDSCH). "Deactivated cells" are those configured cells that the UE is not monitoring the transmission PDCCH. It should be noted that a "cell" may be described in terms of differing dimensions. For example, a "cell" may have temporal, spatial (e.g., geographical) and frequency characteristics.

The systems and methods disclosed may involve carrier aggregation. Carrier aggregation refers to the concurrent utilization of more than one carrier. In carrier aggregation, more than one cell may be aggregated to a UE. In one example, carrier aggregation may be used to increase the effective bandwidth available to a UE. The same TDD uplink-downlink (UL/DL) configuration has to be used for TDD CA in Release-10, and for intra-band CA in Release-11. In Release-11, inter-band TDD CA with different TDD UL/DL configurations is supported. The inter-band TDD CA with different TDD UL/DL configurations may provide the flexibility of a TDD network in CA deployment. Furthermore, enhanced interference management with traffic adaptation (eIMTA) (also referred to as dynamic UL/DL reconfiguration) may allow flexible TDD UL/DL reconfiguration based on the network traffic load.

It should be noted that the term "concurrent" and variations thereof as used herein may denote that two or more events may overlap each other in time and/or may occur near in time to each other. Additionally, "concurrent" and variations thereof may or may not mean that two or more events occur at precisely the same time.

Licensed-assisted access (LAA) may support LTE in unlicensed spectrum. In a LAA network, the DL transmission may be scheduled in an opportunistic manner. For fairness utilization, an LAA eNB may perform functions such as clear channel assessment (CCA), listen before talk (LBT) and dynamic frequency selection (DFS) before transmission. When the eNB performs LBT, the eNB cannot transmit any signals, including reference signals.

In LAA, CCA detection and LBT are used to share the unlicensed carrier among other unlicensed transmissions like WiFi and other LAA operators. The CCA timeslot length and structure need to be defined to perform the required functions.

Since an unlicensed transmission from WiFi or other LAA cells may be unsynchronized with a given LAA cell, if the CCA structure is defined based on the end of a previous transmission, the CCA slots may not be synchronized with subframe or orthogonal frequency division multiplexing (OFDM) symbol boundaries. This will cause unnecessary complexity to eNB and UE implementation. Therefore, it may be beneficial to define CCA timeslot alignment methods for both downlink (DL) and uplink (UL) LAA transmissions.

The systems and methods described herein provide CCA timeslot structures for different LAA methods. One LAA method may include DL transmission with frame based equipment (FBE). Another method may include DL transmission with load based equipment (LBE).

For DL transmission with FBE, the CCA timeslot can be defined by two approaches. In a first approach, an initial CCA (ICCA) timeslot (also referred to as a long CCA timeslot, initial CCA slot, and long CCA slot), may be applied immediately before the subframe boundary configured for DL LAA transmission. A LAA cell may transmit a DL subframe burst if the channel is not occupied (i.e., sensed as idle) during the ICCA timeslot.

In a second approach, multiple short CCA timeslots may be used as the initial CCA timeslot, and are applied immediately before the subframe boundary configured for DL LAA transmission. The short CCA timeslot is also referred to as short CCA slot, backoff slot and enhanced CCA (ECCA) slot. A LAA cell may transmit if the channel is not occupied (i.e., sensed as idle) during these multiple short CCA timeslots.

For DL transmission with load based equipment (LBE), the CCA timeslot can also be defined by two approaches. In a first approach, the CCA timeslot structure is aligned with an OFDM symbol. In a second approach, the CCA timeslot structure is aligned based on subframe structure.

In these approaches, the initial CCA or the last CCA timeslot before LAA transmission may be adjusted to synchronize the CCA slots with the subframe or OFDM symbols. Additionally, the initial CCA or the last CCA timeslot before LAA transmission may be synchronized among LAA cells scheduled under the same eNB.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more eNBs 160 and one or more UEs 102 in which systems and methods for LAA may be implemented. The one or more UEs 102 communicate with one or more eNBs 160 using one or more antennas 122a-n. For example, a UE 102 transmits electromagnetic signals to the eNB 160 and receives electromagnetic signals from the eNB 160 using the one or more antennas 122a-n. The eNB 160 communicates with the UE 102 using one or more antennas 180a-n.

The UE 102 and the eNB 160 may use one or more channels 119, 121 to communicate with each other. For example, a UE 102 may transmit information or data to the eNB 160 using one or more uplink channels 121. Examples of uplink channels 121 include a PUCCH and a PUSCH, etc. The one or more eNBs 160 may also transmit information or data to the one or more UEs 102 using one or more downlink channels 119, for instance. Examples of downlink channels 119 include a PDCCH, a PDSCH, etc. Other kinds of channels may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the eNB 160 using one or more antennas 122a-n. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122a-n. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data, which may be stored in a data buffer 104. A second UE-decoded signal 110 may comprise overhead data and/or control data. For example, the second UE-decoded signal 110 may provide data that may be used by the UE operations module 124 to perform one or more operations.

As used herein, the term "module" may mean that a particular element or component may be implemented in hardware, software or a combination of hardware and software. However, it should be noted that any element denoted as a "module" herein may alternatively be implemented in hardware. For example, the UE operations module 124 may be implemented in hardware, software or a combination of both.

In general, the UE operations module 124 may enable the UE 102 to communicate with the one or more eNBs 160. The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the eNB 160.

The UE operations module 124 may provide information 136 to the decoder 108. For example, the UE operations module 124 may inform the decoder 108 of an anticipated encoding for transmissions from the eNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the eNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the eNB 160. For instance, the one or more transmitters 158 may transmit during a UL subframe. The one or more transmitters 158 may upconvert and transmit the modulated signal(s) 156 to one or more eNBs 160.

The eNB 160 may include one or more transceivers 176, one or more demodulators 172, one or more decoders 166, one or more encoders 109, one or more modulators 113, a data buffer 162 and an eNB operations module 182. For example, one or more reception and/or transmission paths may be implemented in an eNB 160. For convenience, only a single transceiver 176, decoder 166, demodulator 172, encoder 109 and modulator 113 are illustrated in the eNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data, which may be stored in a data buffer 162. A second eNB-decoded signal 168 may comprise overhead data and/or control data. For example, the second eNB-decoded signal 168 may provide data (e.g., PDSCH HARQ-ACK information) that may be used by the eNB operations module 182 to perform one or more operations.

In general, the eNB operations module 182 may enable the eNB 160 to communicate with the one or more UEs 102. The eNB operations module 182 may include one or more of a load based equipment (LBE) timeslot structure determination module 194 and a frame based equipment (FBE) timeslot structure determination module 196.

The Licensed-Assisted Access (LAA) in an unlicensed band for LTE (also referred to as LTE unlicensed or unlicensed LTE) allows opportunistic usage of unlicensed carrier for LTE transmissions.

The LAA transmission is assisted with a licensed band. Carrier aggregation (CA) is one operation that may be performed with an unlicensed LAA cell operating with a licensed LTE cell. With CA, the radio frame (e.g., the system frame number (SFN)) may be synchronized across all serving cells. Furthermore, the subframe indexes may also be synchronized.

As used herein, the term LAA cell refers to a set of communication channels between a UE 102 and an eNB 160 in which LAA operations may be performed. A LAA cell refers to a serving cell that operates on an unlicensed carrier. In current definition, a LAA cell can only be a secondary cell, and is configured by a licensed cell. An LAA cell may also be referred to as an LAA serving cell.

In an LAA network, a DL or UL transmission may be scheduled in an opportunistic manner. For fairness utilization, a LAA node (e.g., a LAA eNB or a LAA UE) is required to perform some functions (e.g. clear channel assessment (CCA), listen before talk (LBT)) before any transmission. Thus, a LAA transmission cannot guarantee a transmission at fixed subframe boundaries.

Therefore, a LAA subframe transmission may need to perform carrier sensing, and if there is no ongoing transmission, the LAA subframe may be transmitted. Otherwise, the LAA node should defer the transmission and perform clear channel assessment (CCA) again at the next contention access region.

In LAA, the serving cell should be synchronized with a licensed cell. The time used for carrier sensing and CCA will be removed from the first LAA subframe transmission.

In LAA, an initial CCA (ICCA) slot may be defined as the timeslot for initial transmission of a LAA subframe. A LAA eNB 160 may start a backoff procedure after the channel is idle for at least a length of an ICCA.

A minimum CCA (MCCA), i.e., minimum enhanced CCA (ECCA) slot, slot may be defined as the backoff timeslot used in a backoff procedure. The MCCA slot can also be referred as a backoff slot or a short CCA slot or simply as an enhanced CCA (ECCA) slot. In some implementations, a MCCA or ECCA slot less than 20 microseconds (μs) may be used.

If a backoff procedure is suspended by an unlicensed transmission, a LAA eNB 160 may resume the backoff procedure after the channel is idle for a defer period. The defer period may have a length that is at least the time of an ICCA. The defer period may be configured with different lengths for different LAA packets with different quality of service (QoS) requirements. The defer period may be the same as ICCA. In a network with only LAA cells (i.e., no other unlicensed users like WiFi or Bluetooth, etc.) the defer period may be zero.

In some implementations, LAA may operate in the Institute of Electrical and Electronics Engineers (IEEE) 802.11 5 GHz band. As a reference, the slot sizes of the 802.11 5 GHz band are listed. Tslot is a backoff slottime. In one implementation, Tslot (also referred to as SlotTime) is 9 microseconds. A short interframe space (SIFS) is an amount of time in required for a wireless interface (e.g., eNB 160) to process a received frame and to respond with a response frame. In one implementation, the SIFS time (SIFSTime) is 16 microseconds.

DIFS is an amount of time that a wireless interface must sense the status of the wireless medium before transmitting. DIFS may be determined according to SIFS+2·Tslot. In one implementation, DIFS is 34 microseconds.

An arbitration inter-frame spacing (AIFS) may be used to provide a different number of slot times for different packets with different QoS requirements. The number of slot times used in the AIFS is called the arbitration inter frame space number (AIFSN). 802.11 specifies 4 access categories. These categories include AV_VO: voice, AC_VI: video, AC_BE: best effort and AC_BK: background. The voice and video categories use 2 slottimes by default. The best effort category uses 3 slottimes by default. The background traffic uses 7 slottimes by default. AIFS for a given access category (AC) may be calculated as $$AIFS[AC]=AIFSN[AC] \times SlotTime+SIFSTime. \quad (1)$$

Regardless of any defined ICCA, defer period and CCA slot sizes, the CCA timeslots of a LAA cell may become unsynchronized with regard to a subframe structure if the ICCA or defer period starts immediately after the channel becomes idle. For an eNB 160 that schedules multiple LAA cells, the unsynchronized CCA among different LAA cells will make the system very complicated. Therefore, the systems and methods described herein provide different approaches for synchronizing and aligning CCA slots.

The LBE timeslot structure determination module 194 may determine a CCA timeslot structure for a DL transmission on an LBE LAA cell. A synchronized CCA timeslot structure, in which the CCA slot size is defined based on a fraction of an OFDM symbol length, and a CCA timeslot can be well-defined within a subframe structure. With this structure, the CCA timeslot length may be a fraction of an OFDM symbol length. In other words, an OFDM symbol may be divided into multiple CCA timeslots.

The minimum CCA (MCCA) slot (or ECCA slot), initial CCA (ICCA) and defer period (as defined above) may be used for LAA transmission with a slot structure described herein. An example of an MCCA and ICCA slot structure in an OFDM symbol is described in connection with FIG. 6.

It should be noted that there is a subtle difference between an initial CCA slot and a defer period. An initial CCA may be required before a backoff process for the initial transmission of a packet. If a backoff process of a LAA cell is interrupted or suspended because another unlicensed transmission is detected, a defer period is required after the busy period and before the backoff process resumes.

In one implementation, the initial CCA slot can be the same as a defer period. In another implementation, the defer period and initial CCA slot may be different.

The sizes may be selected to provide comparable lengths as in WiFi (i.e., IEEE 802.11). Since LAA is mainly used for small cell deployment, the subframe may be based on normal cyclic prefix (CP). However, to have a complete solution, the sizes of the slots and periods may be defined for normal CP and extended CP, respectively.

The minimum CCA (MCCA) slot may be further defined. For normal CP, an OFDM symbol length is $2208 \cdot T_S$ for the first OFDM symbol in a slot and $2192 \cdot T_S$ for the other OFDM symbols. The MCCA slot may also be referred to as a short CCA (SCCA) timeslot or a backoff CCA slot or a minimum ECCA slot. The MCCA slot may be defined as ⅛ of an OFDM symbol length (i.e., $276 \cdot T_S$ for the first OFDM symbol in a slot and $274 \cdot T_S$ for the other OFDM symbols). This may be approximately 9 microseconds, which is comparable to the backoff slot time of 802.11 in the 5 GHz band.

Similarly, for extended CP, an OFDM symbol is $2560 \cdot T_S$. A MCCA slot for extended CP may be defined as ⅛ of an OFDM symbol length or $320 \cdot T_S$. This may be approximately 10.4 microseconds.

The initial CCA (ICCA) slot may also be further defined. An ICCA slot may also be referred to as a long CCA slot. As described above, for a normal CP, the OFDM symbol length is $2208 \cdot T_S$ for the first OFDM symbol in a slot and $2192 \cdot T_S$ for the other OFDM symbols.

In a first alternative, the ICCA slot, may be 4 times of the MCCA slot (i.e., short CCA timeslot). In other words, the ICCA slot may be half of an OFDM symbol length (i.e., $1104 \cdot T_S$ for the first OFDM symbol in a slot and $1096 \cdot T_S$ for the other OFDM symbols). This may be, approximately 35.7 microseconds, which is also comparable to the DIFS size of 34 microseconds in 802.11 at 5 GHz.

In a second alternative, the ICCA slot may be 2 times the MCCA slot. In other words, the ICCA may be ¼ of an OFDM symbol length (i.e., $552 \cdot T_S$ for the first OFDM symbol in a slot and $548 \cdot T_S$ for the other OFDM symbols). This may be approximately 18 microseconds. This ICCA slot can ensure no interruption to WiFi traffic while providing a shorter initial CCA for LAA cells. In another example, the initial CCA slot may be 3 times of the minimum CCA slot.

Similarly, for extended CP, an OFDM symbol is $2560 \cdot T_S$. In one alternative, the ICCA slot (i.e., the long CCA timeslot) may be 4 times the MCCA slot. In other words, the ICCA slot for extended CP may be half of an OFDM symbol length (i.e., $1280 \cdot T_S$). This may be approximately 41.70 microseconds. In another alternative, the ICCA slot for extended CP may be 2 times the MCCA slot. In other words, the ICCA slot may be of an OFDM symbol length (i.e., $640 \cdot T_S$). This may be approximately 20.8 microseconds. In another example, the ICCA slot may be 3 times the MCCA slot.

In a third alternative, the ICCA slot may be defined for each traffic access category (AC) in LAA according to Equation (2).

$$ICCA[AC]=ICCAN[AC]*MCCA+ICCAmin \quad (2)$$

In Equation (2), MCCA is the minimum CCA slot defined above. ICCAmin is the minimum initial CCA slot size defined in the two alternatives above. AC is the access category, access class, or QoS priority level of a LAA packet. ICCAN[AC] is the extra number of CCA timeslots required for the packet of the given AC. The number of AC may be 3 as in WiFi, or may be other numbers such as 4, 5, 6, 7, 8, etc. The ICCAN[AC] can be defined as an integer number that is smaller for packets with higher priority, and larger for packets with lower priority.

In an example that is comparable to WiFi, 4 access categories (e.g., AV_VO: voice, AC_VI: video, AC_BE: best effort & AC_BK: background) may be specified for LAA. The voice and video categories may use ICCAN[AC] =0 by default. The best effort category may use 1 slottimes. The background traffic category may use 5 slottimes by default.

In another example, 4 QoS priority levels may be defined with level 1 as the highest and level 4 as the lowest. The ICCAN parameter can be set as 0, 2, 4, or 8 respectively for the QoS levels of 1, 2, 3, or 4.

In a fourth alternative, if the eNB 160 knows that there are no WiFi access points deployed in the region, the ICCA slot can be the same as the MCCA slot.

The defer period may also be further defined. The defer period is applied if a backoff procedure is suspended due to a busy channel caused by other unlicensed transmissions.

In a first alternative of the defer period, the defer period can be the same as the ICCA. In a second alternative of the defer period, the defer period is always based on the AC of the traffic. In other words, even if ICCA is a fixed value, as proposed above, the defer period may use the third alternative of ICCA above. In a third alternative of the defer period, if the eNB 160 knows that there are no WiFi access points deployed in the region, the defer period can be 0. In other words, the MCCA slot can be applied immediately after the channel is idle again.

With the described synchronized CCA size, ICCA and defer periods may be aligned with CCA timeslots because they always occupy multiple MCCA slots. Therefore, for LAA CCA and contention access, a synchronized baseline timeslot structure is assumed. The baseline timeslot under the CCA structure is a MCCA slot, which is a fraction of an OFDM symbol. This may be referred to as a baseline MCCA timeslot, or the baseline minimum ECCA slot.

The MCCA, ICCA and defer period may clarify the use of the synchronized structure. In a LAA cell, each subframe may be divided into MCCA slots. Because a MCCA slot is a fraction of an OFDM symbol, MCCA slots are fully synchronized.

Figure 7:
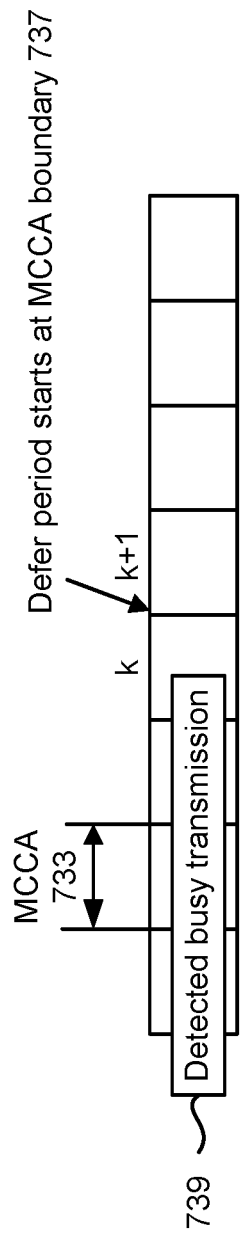
FIG. 7 illustrates an example of CCA and a defer period structure.

The channel is treated as busy if another transmission is detected within a CCA slot. The MCCA, ICCA or defer period may start at a MCCA boundary. Thus, even if a transmission ends or a new packet arrives in the middle of a CCA slot, a defer period or an ICCA slot may start at the next MCCA slot boundary. FIG. 7 shows an example of a defer period after the backoff is suspended due to a busy channel.

Other CCA slot and defer period sizes may also be defined. In particular, the synchronization methods may be applied to CCA slots that are not aligned with OFDM symbol lengths. The CCA slots may be specified or configured with other values from the proposed values described above.

In an implementation, the CCA slot configuration may follow WiFi. In this implementation, the MCCA slot may equal the slot time of WiFi. For example, MCCA may be 9 microseconds. The ICCA slot may equal the DIFS time. For example, ICCA may be 34 microseconds. Alternatively, the ICCA may equal AIFS[AC] based on the access category. The defer period may equal AIFS[AC] based on the access category.

It should be noted that with this implementation, a subframe or an OFDM symbol may not fit with an integer number of MCCA, ICCA or defer period. Furthermore, the ICCA and defer periods are not an integer number of MCCA slots either.

Other implementations may also be considered to improve the CCA structure and reduce system complexity. In one implementation, the MCCA slot is 10 microseconds, the ICCA slot is an integer number of MCCA (e.g., 30 microseconds or 40 microseconds, with 3 or 4 MCCA slots, respectively) and the defer period is an integer number of MCCA based on the access category.

With this implementation, the MCCA slot is not defined as a fraction of the OFDM symbol. Furthermore, the ICCA slot and defer period may not be sizes of integer number of minimum CCA slots. Thus, it may be very difficult to align the CCA slots with a subframe structure.

Figure 8:
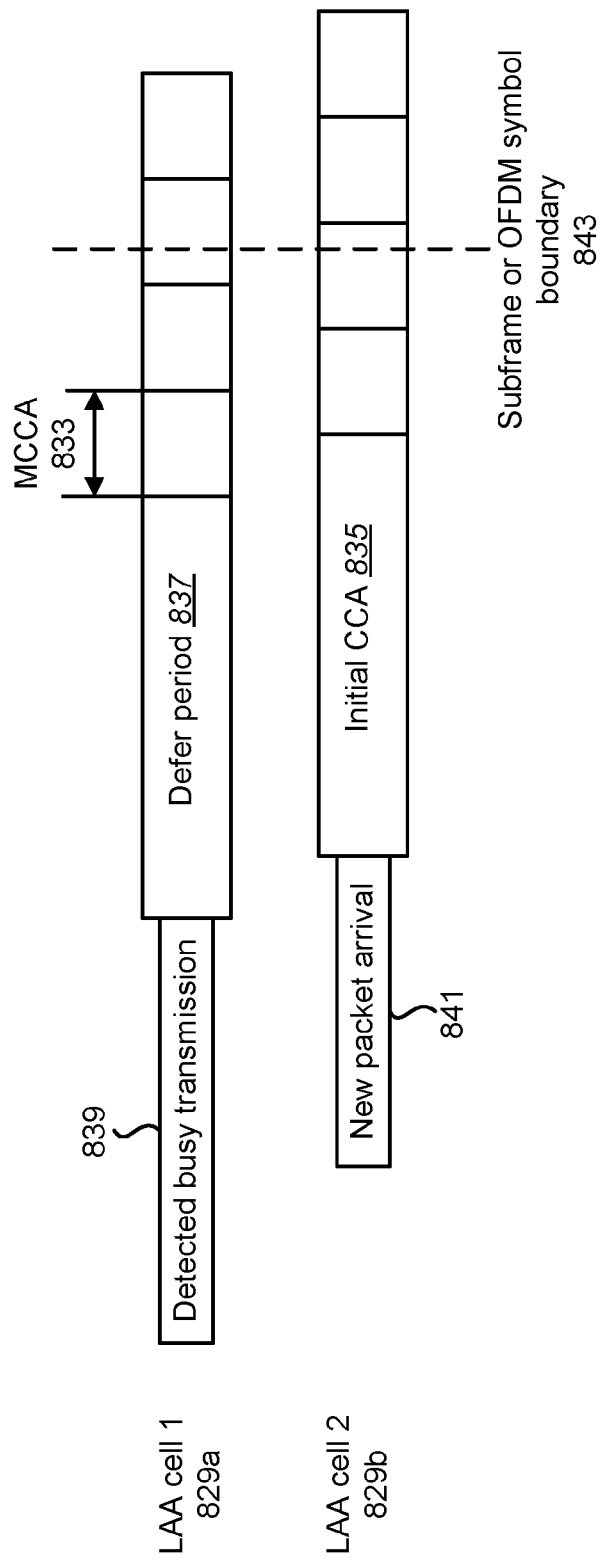
FIG. 8 illustrates an example of issues with unsynchronized CCA and defer periods.

If the ICCA slot or defer period start immediately after a new packet arrival or after the end of a busy channel, and the MCCA slot is immediately after an ICCA slot or a defer period, then the CCA slots may not align or synchronize with the subframe or OFDM structure. Moreover, if there are multiple LAA cells controlled by the same scheduler (e.g., eNB 160), different LAA cells may have different CCA slot timing. This makes it very difficult to coordinate multiple LAA cell operations (e.g., allowing frequency reuse of multiple LAA cell transmissions). FIG. 8 illustrates an example of issues caused by unsynchronized CCA and defer periods.

To allow multiple LAA cell operation, the MCCA slots for backoff procedures of each LAA cell under the same scheduler may be synchronized and aligned with each other. Because LTE transmissions may be OFDM symbol based and subframe based, approaches are disclosed to align the CCA slots at the subframe level and the OFDM symbol level, respectively.

Some of the CCA slots and defer periods may be longer than the specified size. In other words, the specified sizes for MCCA, ICCA and defer periods define the minimum lengths of these timeslots.

With LAA contention access, a fractional OFDM symbol signal may be specified to reserve the channel once an LAA cell obtains the channel. In this case, the backoff counter of a LAA node reaches 0. The fractional OFDM symbol may start transmission at a CCA slot boundary.

Figure 9:
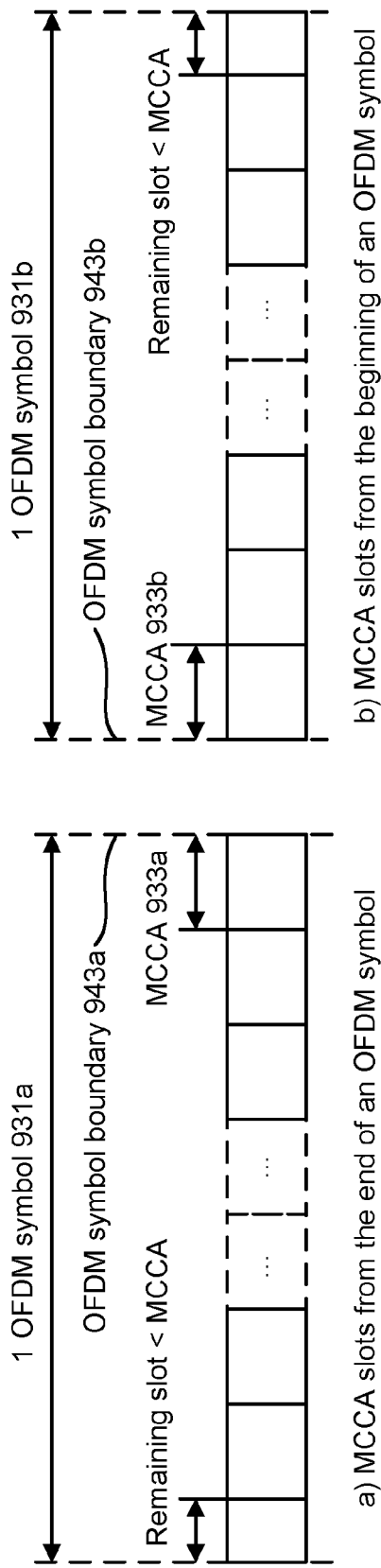
FIG. 9 illustrates examples of MCCA slot alignment within an OFDM symbol.

To provide synchronized CCA slots among LAA cells and UEs 102, several approaches may be performed. In a first approach for CCA slot alignment, MCCA slots may be aligned with OFDM symbol boundaries. Because effective LTE signals are OFDM symbol based, it may be beneficial to align the CCA slots with the start timing of an OFDM symbol. FIG. 9 illustrates MMA slot alignment within an OFDM symbol.

Figure 10:
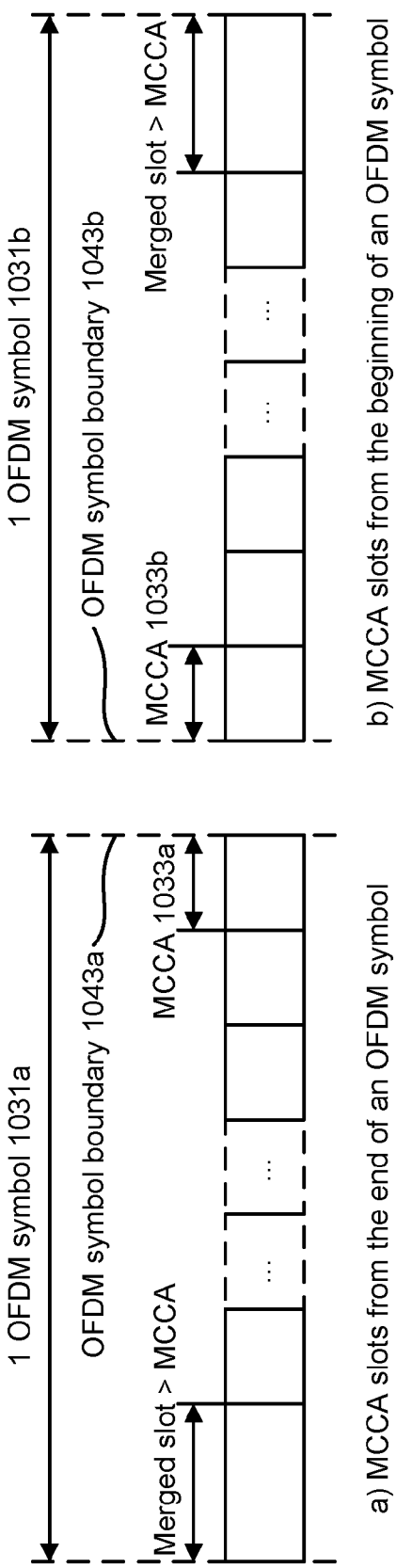
FIG. 10 illustrates examples of MCCA slot alignment with a merged CCA slot within an OFDM symbol.

If MCCA is defined as the minimum CCA slot length, the remaining slot may be merged or combined with the closest MCCA slot to form a merged CCA slot that is longer than MCCA. FIG. 10 illustrates a merged CCA slot formed from a remaining slot that is smaller than MCCA.

Figure 11:
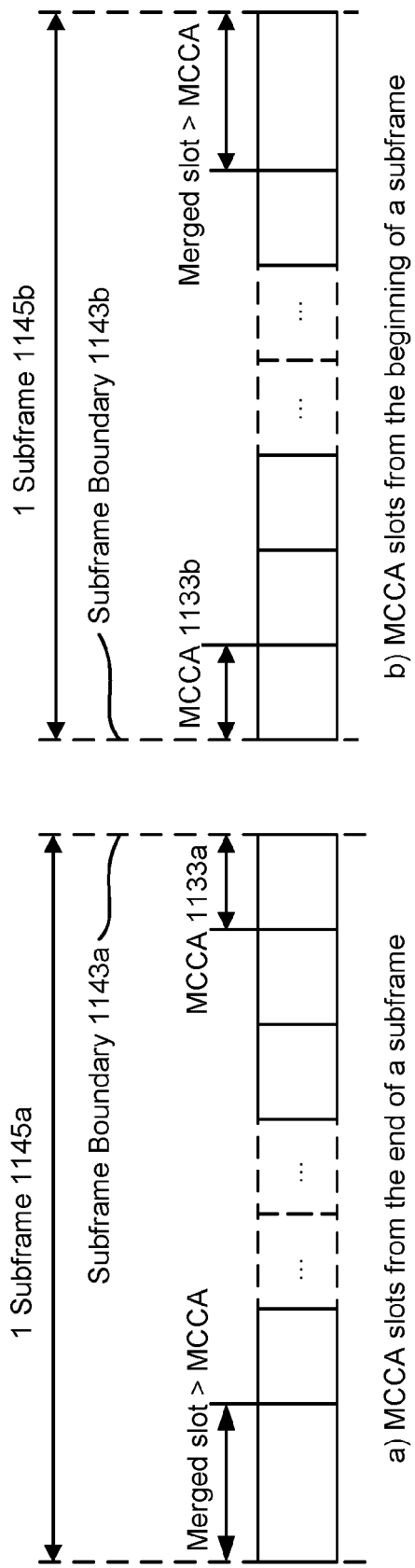
FIG. 11 illustrates examples of CCA slot alignment within a subframe.

In a second approach for CCA slot alignment, MCCA slots may be aligned with subframe symbol boundaries. Similar to the first approach for CCA slot alignment, the MCCA is aligned with subframe boundaries instead of OFDM symbol boundaries. With this approach, there is only one merged CCA slot needed in a subframe compared with one merged subframe in a symbol. FIG. 11 illustrates examples of CCA slot alignment within a subframe.

Therefore, for LAA CCA and contention access, a synchronized baseline timeslot structure may be assumed. The baseline timeslot under the CCA structure may be a MCCA slot or a merged (or extended) slot as described above. If the MCCA is defined as 10 microseconds, the subframe may be filled with MCCA slots without a merged slot. However, no matter which approach is used, the LAA eNB 160 and LAA UEs 102 may follow the same CCA alignment structure.

In one implementation, the CCA alignment structure may be specified. In another implementation, the eNB 160 may inform the UE 102 of the CCA alignment structure by higher layer signaling.

With a CCA alignment structure, the initial CCA slot and defer period may be aligned with the MCCA slots. Thus, the ICCA and defer periods define the minimum required length for ICCA and defer periods. The actual ICCA and defer period length may vary slightly due to alignment with MCCA slots.

Figure 12:
FIG. 12 illustrates an example of an actual defer period under an aligned CCA slot structure.

In a first approach for aligned CCA slot structure, ICCA and/or defer periods can start at any given time, but can end only at a MCCA slot boundary. In this approach, the ICCA and/or defer period may start immediately after the channel becomes idle after a busy period. But, the end of the ICCA and/or the defer period may be in the middle of a MCCA slot based on the specified length and the CCA slot alignment structure. In this case, the ICCA and/or defer period may be extended to the end of the MCCA slot. Thus, the actual ICCA or actual defer period length may be longer than the specified value. FIG. 12 shows an example of this approach using a defer period.

Figure 13:
FIG. 13 illustrates another example of an actual defer period under an aligned CCA slot structure.

In a second approach for aligned CCA slot structure, ICCA and/or defer periods may start at a MCCA slot boundary and end at a MCCA slot boundary. In this approach, the ICCA and/or defer period may only start at a CCA slot boundary based on the aligned CCA slot structure. Thus, if the time is within a MCCA slot when the channel becomes idle again after a busy period, the MCCA slot is considered as busy and excluded from the ICCA and/or defer period. Furthermore, the end of an ICCA and/or a defer period based on the specified length may be in the middle of a MCCA slot based on the CCA slot alignment structure. In this case, the ICCA and/or defer period is extended to the end of the MCCA slot. Thus, the actual ICCA or actual defer period length may be longer than the specified value. FIG. 13 shows an example this approach using a defer period.

It should be noted that if the ICCA and defer period are defined as multiples of the MCCA slots, there will be no misalignment issue between the ICCA and defer period with a MCCA, except when a merged CCA slot is present.

Frame based equipment (FBE) CCA slot alignment is also described. The above CCA slot structures may be primarily targeted for load based equipment (LBE) channel access. However, an LAA cell may be configured with FBE channel access. Moreover, under the same operator or scheduler, the eNB 160 may configure different channel access methods on different LAA cells. It is important to consider the CCA structure and co-existence with different channel access methods.

Figure 14:
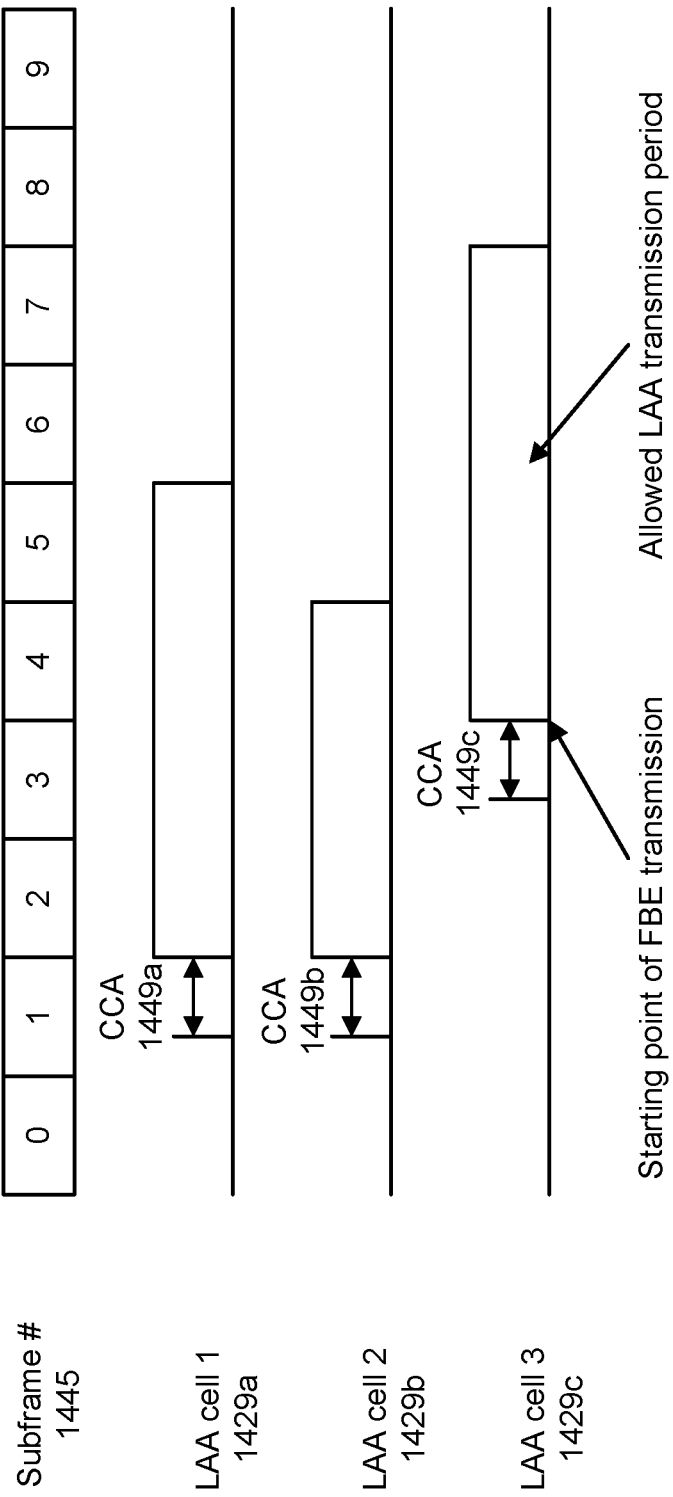
FIG. 14 illustrates an example of frame based equipment (FBE) channel access.

The FBE timeslot structure determination module 196 may determine a CCA timeslot structure for a DL transmission on an FBE LAA cell. For a LAA cell following FBE channel access, a subframe pattern or bitmap may be configured to define the subframes that the given LAA cell may access on the channel. For LAA cells under the same operator or scheduler, the FBE subframe pattern of each LAA may be the same or different. Multiple LAA cells may be configured with the same subframe pattern if simultaneous LAA transmissions from these LAA cells are beneficial with frequency reuse. On the other hand, LAA cells with different subframe patterns may be better to operate in exclusive transmission between each other. It should be noted that the subframe patterns of different LAA cells may be exclusive to each other, and may have overlap with each other. FIG. 14 illustrates an example of FBE channel access.

For FBE channel access, the LAA transmission may start at a subframe boundary. To avoid collision with ongoing unlicensed transmission, CCA detection and LBT should be performed immediately before the subframe boundary. To avoid potential interruption of an ongoing WiFi packet exchange, the CCA should be performed at least in an initial CCA slot (i.e., an ICCA slot should be used before the allowed LAA transmission period). This may be applied to both UL and DL LAA transmissions.

With the CCA timeslot structure described above, the MCCA is a fraction of an OFDM symbol, and the ICCA and/or defer period sizes are multiples of MCCA slots. The ICCA slot before the subframe boundary in FBE may be aligned with the CCA structure of LBE. Thus, if both LBE LAA cells and FBE LAA cells are configured under the same eNB scheduler, LBE and FBE LAA cells may maintain their own CCA slot structures.

However, if the CCA sizes are applied for CCA slots that are not aligned with OFDM symbol lengths, the subframe or OFDM symbol length is not a multiple of MCCA size, and ICCA and/or defer period are not multiples of MCCA sizes. If both LBE LAA cells and FBE LAA cells are configured under the same eNB scheduler, the CCA slots for LBE may be different from the CCA slot for FBE, and not aligned with each other.

In one implementation, LBE and FBE LAA cells may maintain their own CCA slot structures. In another implementation, some special handling may be needed.

Figure 15:
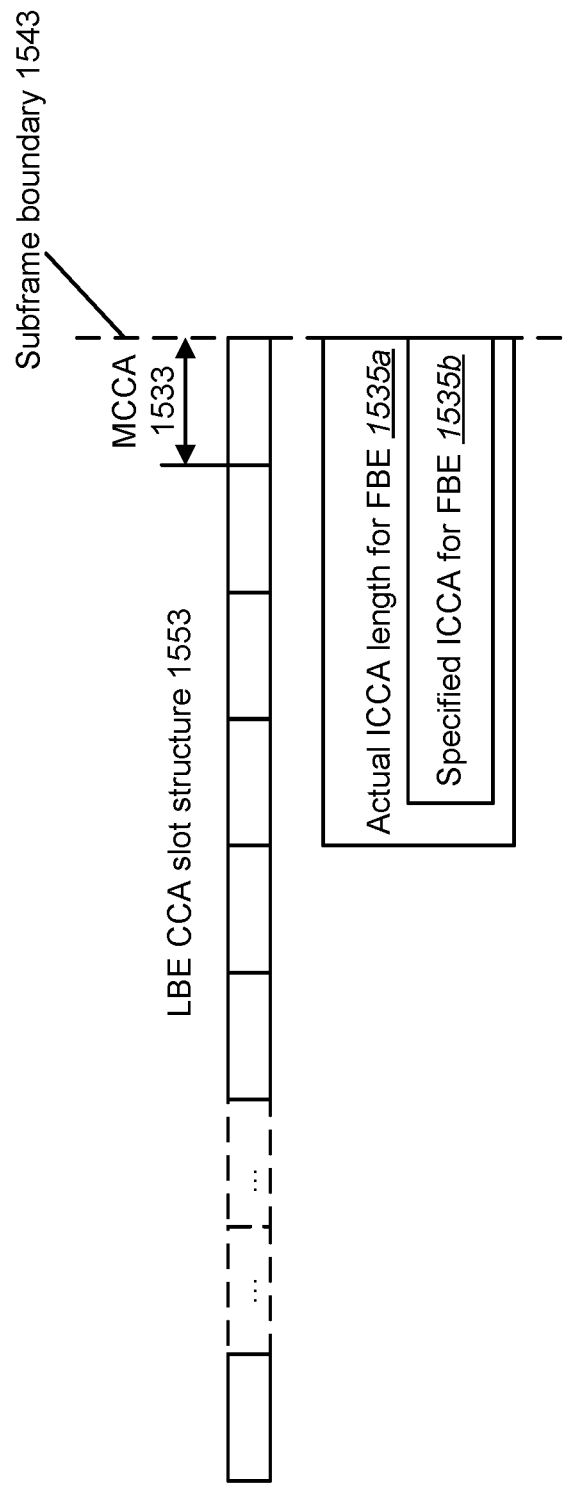
FIG. 15 illustrates an example of FBE CCA slot alignment.

In one approach for FBE CCA slot alignment, the LBE CAA slot structure is maintained and the FBE CCA slot may be adjusted and extended to the closest CCA slot boundaries based on LBE CCA structure. FIG. 15 shows an example assuming MCCA is aligned at the end of a subframe.

Figure 16:
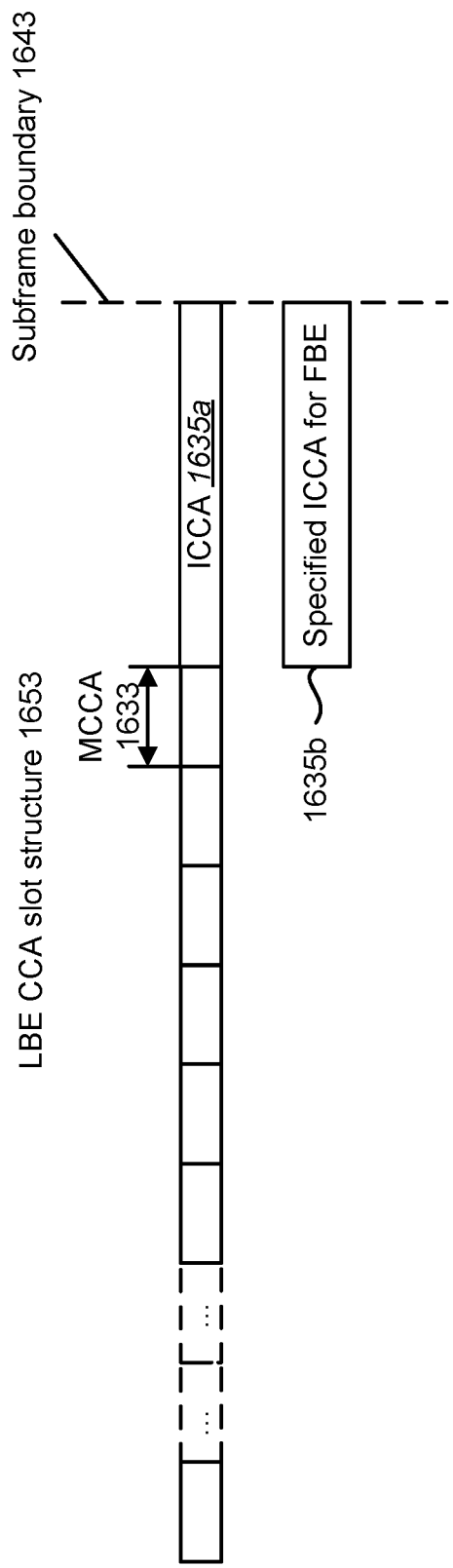
FIG. 16 illustrates another example of FBE CCA slot alignment.

In another approach for FBE CCA slot alignment, the FBE LAA slot structure is maintained, the LBE CCA slot may be adjusted so that an ICCA is included before a subframe allowed for LBE transmission. Then, MCCA slots are aligned for LBE CCA structure. FIG. 16 shows an example assuming MCCA is aligned before an ICCA at the end of a subframe before the subframe allowed for FBE transmission.

To differentiate the priority of different traffic and/or packets, different CCA time intervals may be used similar to the defer period. With this approach, a defer period may be used based on the access category of the pending packet before the allowed LAA transmission period. This applies to both UL and DL LAA transmissions.

In the above description, the term "MCCA slot" has two different definitions. One is the timeslot in which the eNB 160 performs CCA. The other is the baseline unit to define several sorts of CCA timeslots. The eNB 160 does not always perform CCA in every baseline unit. Therefore, to differentiate between these two uses, the former may be referred to as a MCCA slot (e.g., the timeslot in which the eNB 160 performs CCA) and the latter may be referred to as a baseline MCCA slot (e.g., a baseline timeslot or a baseline ECCA slot).

The eNB operations module 182 may provide information 188 to the demodulator 172. For example, the eNB operations module 182 may inform the demodulator 172 of a modulation pattern anticipated for transmissions from the UE(s) 102.

The eNB operations module 182 may provide information 186 to the decoder 166. For example, the eNB operations module 182 may inform the decoder 166 of an anticipated encoding for transmissions from the UE(s) 102.

The eNB operations module 182 may provide information 101 to the encoder 109. The information 101 may include data to be encoded and/or instructions for encoding. For example, the eNB operations module 182 may instruct the encoder 109 to encode transmission data 105 and/or other information 101.

The encoder 109 may encode transmission data 105 and/or other information 101 provided by the eNB operations module 182. For example, encoding the data 105 and/or other information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The eNB operations module 182 may provide information 103 to the modulator 113. This information 103 may include instructions for the modulator 113. For example, the eNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The eNB operations module 182 may provide information 192 to the one or more transmitters 117. This information 192 may include instructions for the one or more transmitters 117. For example, the eNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the eNB 160 to one or more UEs 102 and that a UL subframe may be transmitted from one or more UEs 102 to the eNB 160. Furthermore, both the eNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Figure 2:
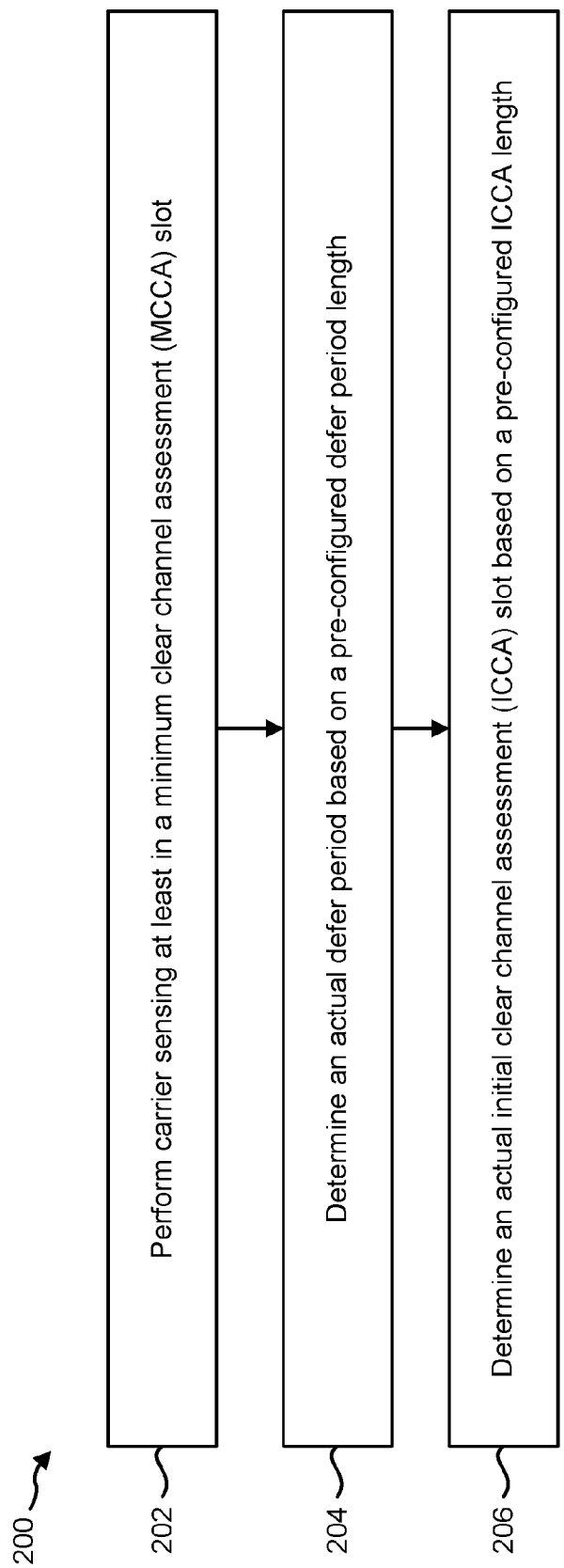
FIG. 2 is a flow diagram illustrating a method for transmitting signals in a LAA serving cell by an eNB.

FIG. 2 is a flow diagram illustrating a method 200 for transmitting signals in a LAA serving cell by an eNB 160. The eNB 160 may communicate with one or more UEs 102 in a wireless communication network. In one implementation, the wireless communication network may include an LTE network. The eNB 160 may configure an unlicensed LAA cell from a licensed LTE cell.

The eNB 160 may perform 202 carrier sensing at least in a minimum clear channel assessment (MCCA) slot. For example, the eNB 160 may perform at least one of CCA and LBT in a MCCA slot. A subframe may consist of N baseline MCCA timeslots, where N is a positive integer. Therefore, the MCCA slot may not lie across subframes. Furthermore, the total length of N times slots is equal to the subframe length. The MCCA slot may consist of one of the baseline MCCA timeslots.

The eNB 160 may determine 204 an actual defer period based on a pre-configured defer period length. The length of the actual defer period may be extended from a pre-configured defer period length. The extension length may be less than the length of one of the baseline MCCA timeslots.

The eNB 160 may determine 206 an actual initial clear channel assessment (ICCA) slot based on a pre-configured ICCA length. The length of the actual ICCA slot may be extended from the pre-configured ICCA length. The extension length may be less than the length of one of the baseline MCCA timeslots.

Figure 3:
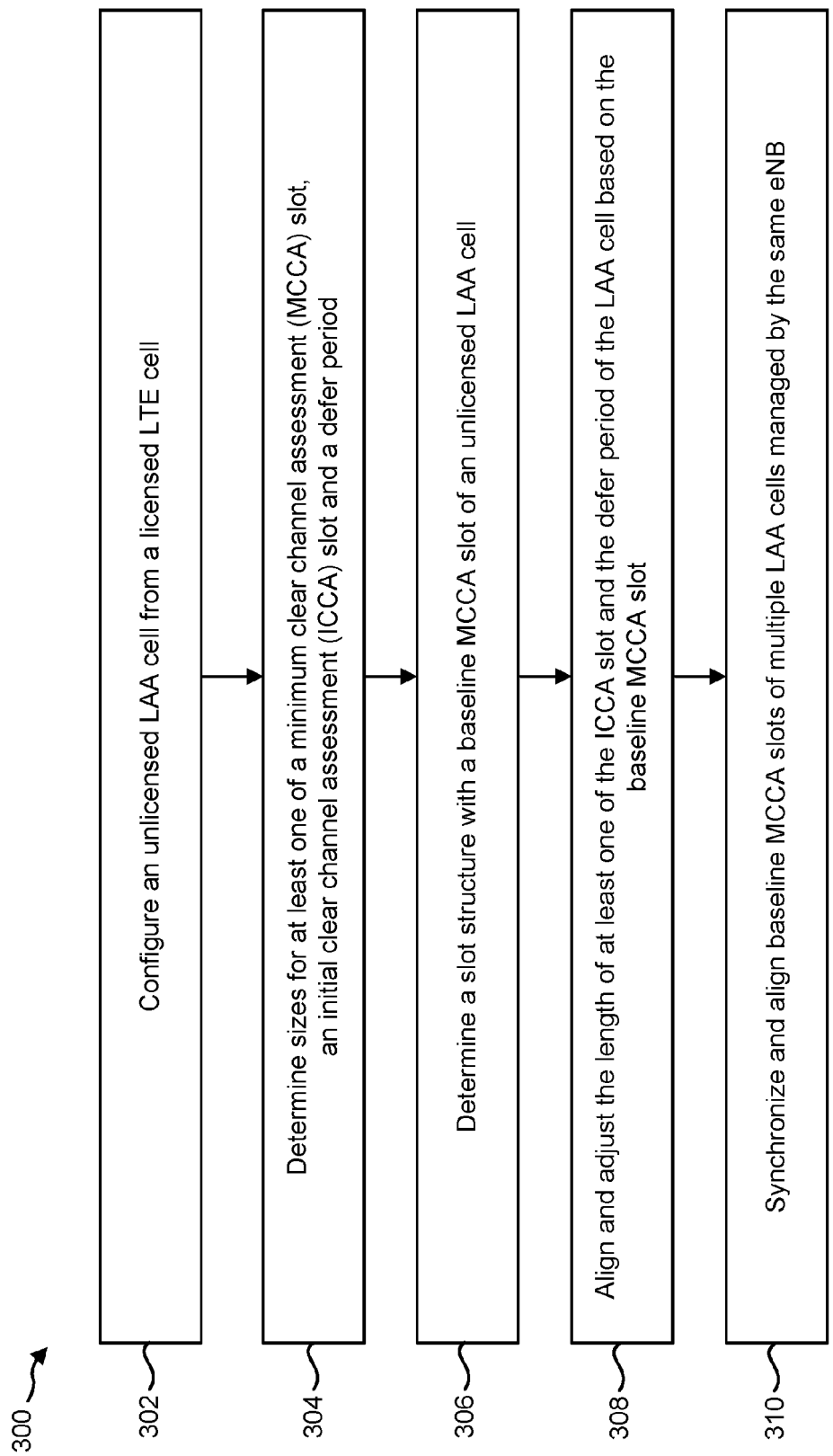
FIG. 3 is a flow diagram illustrating another method for transmitting signals in a LAA serving cell by an eNB.

FIG. 3 is a flow diagram illustrating another method 300 for transmitting signals in a LAA serving cell by an eNB 160. The eNB 160 may communicate with one or more UEs 102 in a wireless communication network. In one implementation, the wireless communication network may include an LTE network. The eNB 160 may configure 302 one or more unlicensed LAA cell from a licensed LTE cell.

The eNB 160 may determine 304 sizes for at least one of a minimum clear channel assessment (MCCA) slot, an initial clear channel assessment (ICCA) slot and a defer period. The MCCA slot may have a size that is a fraction of an OFDM symbol length. The lengths of the ICCA slot and defer period may be multiples of the length of the MCCA slot. In one implementation, the length of the MCCA slot is ⅛ of a Long Term Evolution (LTE) OFDM symbol, and the length of the ICCA slot is ½ of an LTE OFDM symbol.

The eNB 160 may determine 306 a slot structure with a baseline MCCA slot of an unlicensed LAA cell. This may be accomplished as described in connection with FIG. 1.

The eNB 160 may align 308 and adjust the length of at least one of the ICCA slot and the defer period of the LAA cell based on the baseline MCCA slot. The slot structure of a LAA cell may be synchronized and aligned with the MCCA slot with a possible merged slot that is longer than the MCCA slot.

In one approach, the alignment is performed from the end of an OFDM symbol boundary, and the possible merged slot is located at the beginning of an OFDM symbol length. In another approach, the alignment is performed from the beginning of an OFDM symbol boundary, and the possible merged slot is located at the end of an OFDM symbol length. In yet another approach, the alignment is performed from the end of a subframe boundary, and the possible merged slot is located at the beginning of a subframe length. In another approach, the alignment is performed from the beginning of a subframe boundary, and the possible merged slot is located at the end of a subframe length.

The eNB 160 may synchronize 310 and align baseline MCCA slots of multiple LAA cells managed by the eNB 160. In all cases, the initial CCA or the last CCA timeslot before LAA transmission may be adjusted to synchronize the CCA slots with the subframe or OFDM symbols, and to synchronize among LAA cells scheduled under the same eNB 160. The CCA slot structure and alignment method may be specified or signaled to LAA UEs 102 by higher layer signaling.

Figure 4:
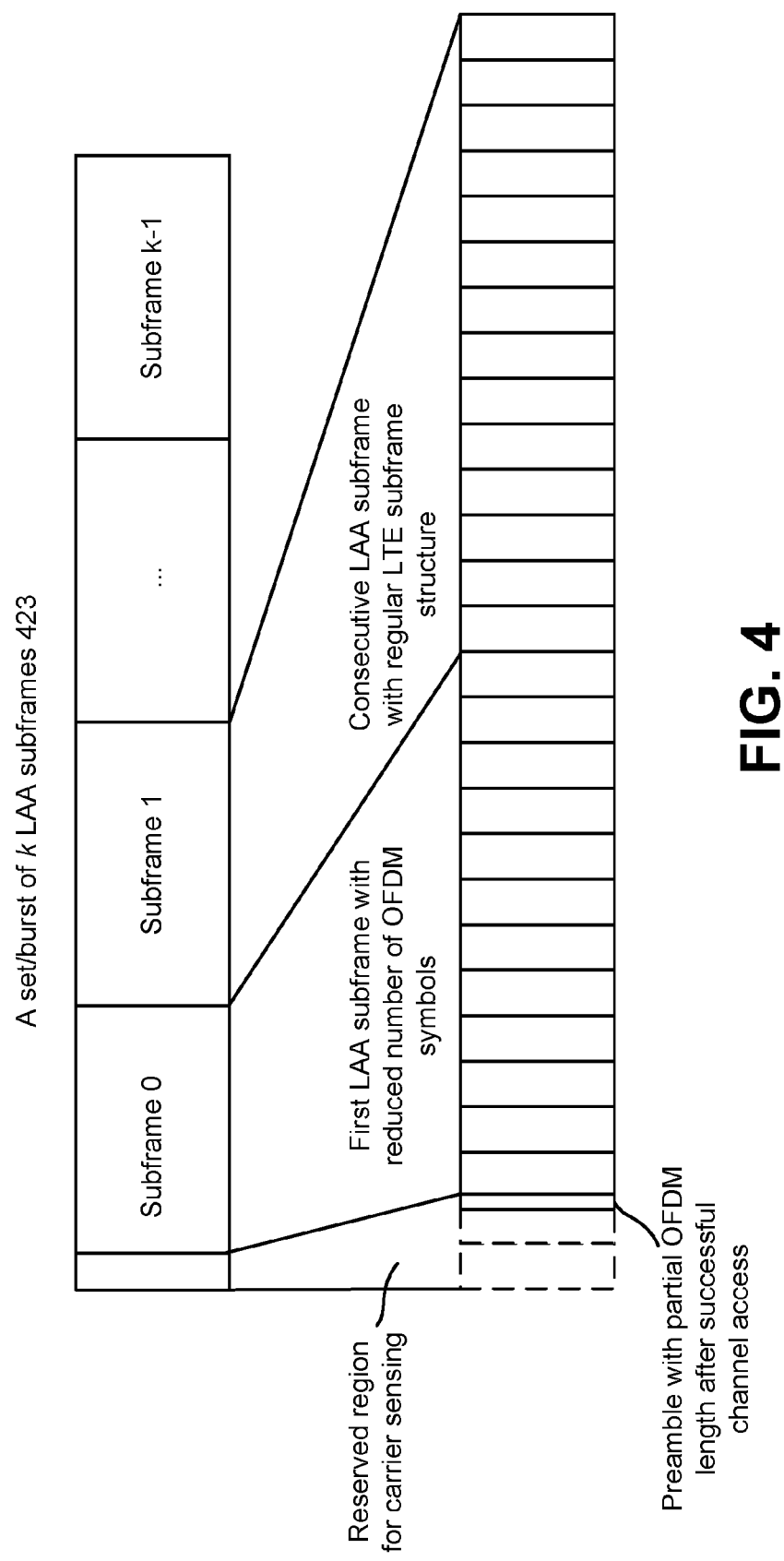
FIG. 4 illustrates an example of a LAA subframe burst transmission.

FIG. 4 illustrates an example of a LAA subframe burst transmission. This transmission may also be referred to as a LAA subframe set transmission. To provide fairness to other networks on the same unlicensed carrier, the eNB 160 may configure a maximum number of continuous subframe transmissions k in a LAA cell (e.g., a set of LAA subframes or a burst of LAA subframes 423). The maximum transmission time in an unlicensed carrier may be different in different regions and/or countries based on the regulatory requirements.

In this example, the subframe is configured with normal cyclic prefix. The first two OFDM symbol lengths are reserved for carrier sensing. Thus, subframe 0 in a set of LAA subframes is a subframe with a reduced number of symbols. A preamble with a partial OFDM length may be transmitted after a successful channel access in front of the first LAA subframe with a reduced number of OFDM symbols. No sensing is necessary for continuous LAA subframe transmission after the first LAA subframe. The regular LTE subframe structure may be applied on consecutive subframes in a LAA subframe set.

It should be noted that the subframe index number in FIG. 4 refers to the index in a LAA subframe burst, instead of the subframe index in a radio frame as in legacy LTE cells.

Figure 5:
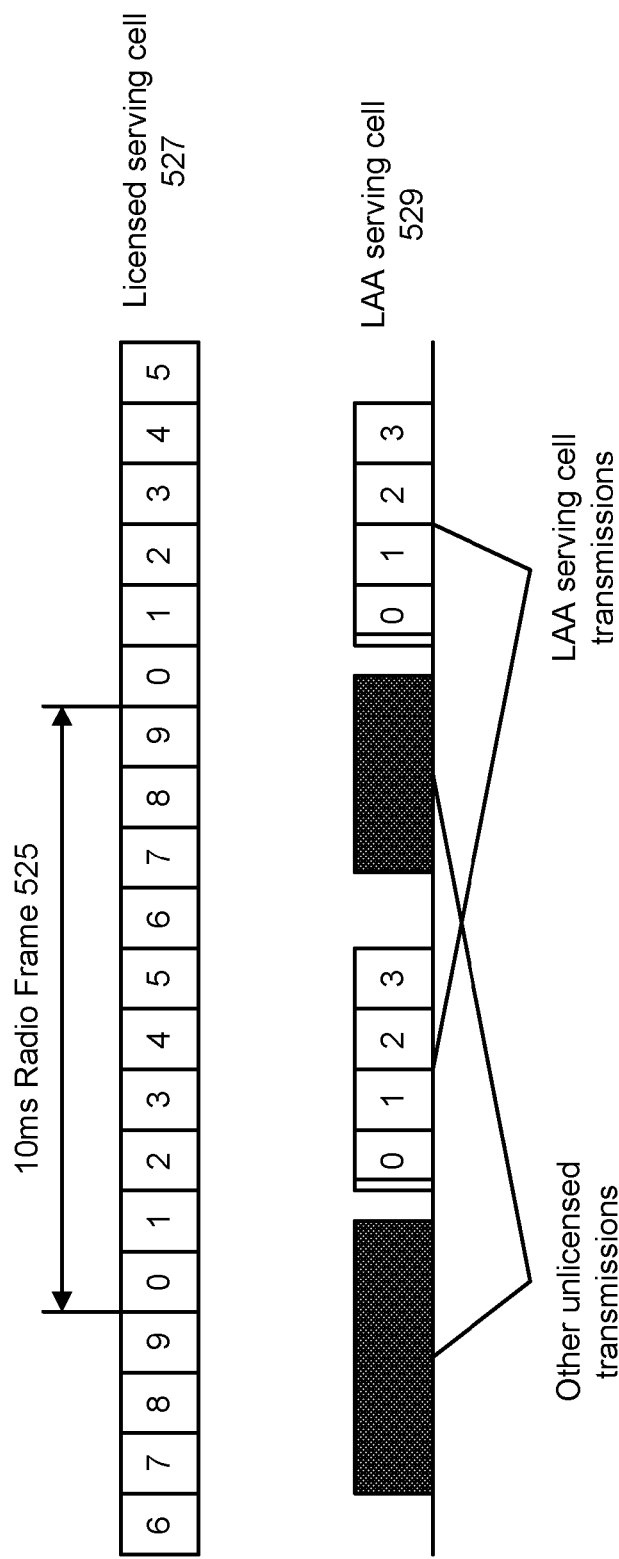
FIG. 5 illustrates an example of LAA coexistence with other unlicensed transmissions.

FIG. 5 illustrates an example of LAA coexistence with other unlicensed transmissions. A licensed serving cell 527 is shown with a 10 ms radio frame 525. A LAA serving cell 529 has LAA serving cell transmissions and other unlicensed transmissions (e.g., Wi-Fi or other LAA cells). Due to carrier sensing and deferred transmissions, the starting of a LAA transmission may occur in any subframe index in the radio frame 525 of the licensed frame structure.

Figure 6:
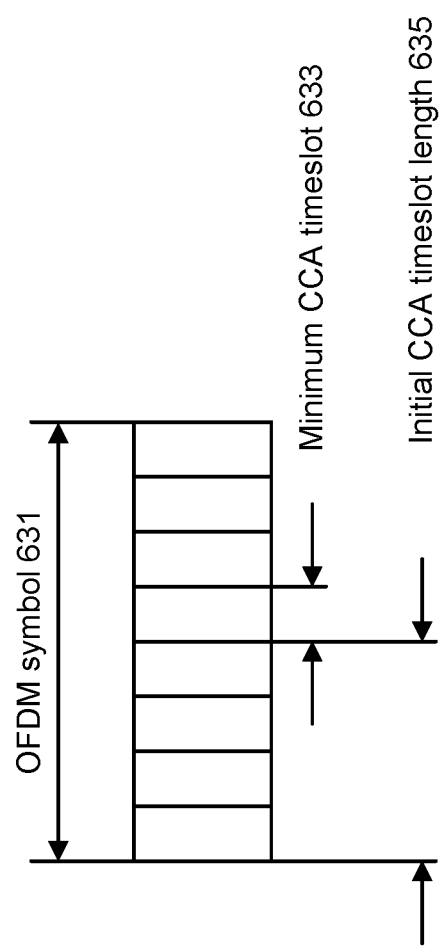
FIG. 6 illustrates an example of a minimum enhanced channel sensing assessment (MCCA) and an initial CCA (ICCA) slot structure in an orthogonal frequency division multiplexing (OFDM) symbol.

FIG. 6 illustrates an example of a minimum enhanced CCA (MCCA) and an initial CCA (ICCA) slot structure in an OFDM symbol 631. In the example illustrated in FIG. 6, a MCCA timeslot 633 is ⅛ for an OFDM symbol 631 length. Therefore, there may be 8 MCCA slots 633 in one OFDM symbol 631. The ICCA timeslot length 635 (i.e., long CCA timeslot) is 4 times the MCCA slot 633 or one half of an OFDM symbol 631. In another implementation (not shown), the ICCA timeslot length 635 may be 2 times the short CCA timeslot (i.e., 2 times the MCCA timeslot 633).

FIG. 7 illustrates an example of CCA and a defer period structure. Specifically, FIG. 7 shows an example of a defer period 737 after the backoff is suspended due to a busy channel.

In this example, a LAA backoff is suspended or interrupted by a detected busy transmission 739. The detected busy transmission 739 ends within MCCA 733 slot k. The LAA cell should treat MCCA 733 slot k as a busy slot.

In 802.11-based WiFi networks, a DIFS follows immediately after the end of the transmission. However, in LAA with a synchronized structure, the defer period 737 may not start immediately after the end of busy transmission. Instead, the defer period 737 may start at the boundary of a MCCA slot 733. In this example, the defer period 737 should start from MCCA 733 slot k+1.

FIG. 8 illustrates an example of issues with unsynchronized CCA and defer periods 837. CCA slots (e.g., MCCA 833 and ICCA 835) for LAA cell 1 829a and LAA cell 2 829b are depicted. If the ICCA slot 835 and defer period 837 start immediately after a new packet arrival 841 or after the end of a detected busy transmission 839, and if the MCCA slot 833 is immediately after the ICCA slot 835 or the defer period 837, then the CCA slots may not align or synchronize with the subframe or OFDM structure.

Also, as illustrated in FIG. 8, a CCA slot may be unsynchronized with an OFDM symbol or subframe boundary 843. Furthermore, the CCA slots of different LAA cells 829 may be unsynchronized with each other. Additionally, the CCA slot of each packet transmission may be shifted due to the uncertainty of other unlicensed transmissions.

FIG. 9 illustrates examples of MCCA slot 933 alignment within an OFDM symbol 931. To synchronize the CCA timeslots of LAA cells, two implementations may be considered, as shown in FIG. 9.

In a first implementation (a), the MCCA slots 933a align with the end of an OFDM symbol 931a at the OFDM symbol boundary 943a. Thus, there may be a remaining slot that is smaller than the MCCA length at the beginning of each OFDM symbol 931.

In a second implementation (b), the MCCA slots 933b align with the start of an OFDM symbol 931b at the OFDM symbol boundary 943b. Thus, there may be a remaining slot that is smaller than the MCCA length at the end of each OFDM symbol 931.

FIG. 10 illustrates examples of MCCA slot 1033 alignment with a merged CCA slot within an OFDM symbol 1031. If MCCA is defined as the minimum CCA slot length, the remaining slot may be merged or combined with the closest MCCA slot 1033 to form a merged CCA slot that is longer than MCCA 1033.

In a first implementation (a), the MCCA slots 1033a align with the end of an OFDM symbol 1031a at the OFDM symbol boundary 1043a. The remaining slot that is smaller than the MCCA length at the beginning of each OFDM symbol 1031a may be merged with the closest MCCA slot 1033a to form a merged slot that is greater than the MCCA length.

In a second implementation (b), the MCCA slots 1033b align with the start of an OFDM symbol 1031b at the OFDM symbol boundary 1043b. The remaining slot that is smaller than the MCCA length at the end of each OFDM symbol 1031b may be merged with the closest MCCA slot 1033b to form a merged slot that is greater than the MCCA length.

FIG. 11 illustrates examples of CCA slot alignment within a subframe 1145. MCCA slots 1133 may be aligned with subframe boundaries 1143. Similar to the approach for CCA slot alignment described in FIGS. 9 and 10, the MCCA 1133 may be aligned with subframe boundaries 1143 instead of OFDM symbol boundaries. With this approach, there is only one merged CCA slot needed in a subframe 1145 compared with one merged subframe in a symbol.

In a first implementation (a), the MCCA slots 1133a align with the end of a subframe 1145a at the subframe boundary 1143a. The remaining slot that is smaller than the MCCA length at the beginning of each subframe 1145a may be merged with the closest MCCA slot 1133a to form a merged slot that is greater than the MCCA length.

In a second implementation (b), the MCCA slots 1133b align with the start of subframe 1145b at the subframe boundary 1143*b*. The remaining slot that is smaller than the MCCA length at the end of each subframe 1145*b* may be merged with the closest MCCA slot 1133*b* to form a merged slot that is greater than the MCCA length.

FIG. 12 illustrates an example of an actual defer period 1237*a* under an aligned CCA slot structure. In this approach, ICCA and/or defer periods can start at any given time, but may end only at a MCCA slot 1233 boundary.

In this example, defer periods can start at any given time, but can end only at a MCCA slot 1233 boundary. The defer period may start immediately when the channel becomes idle after a detected busy transmission 1239. The end of the specified defer period 1237*b* is in the middle of a MCCA slot 1233. In this case, the defer period may be extended to the end of a MCCA slot. Thus, the actual defer period 1237*a* is longer than the specified defer period 1237*b*. Backoff may resume after the actual defer period 1237*a*.

It should be noted that while the actual defer period 1237*a* was discussed in FIG. 12, the same approach may be applied to determine an actual ICCA length.

FIG. 13 illustrates another example of an actual defer period 1337*a* under an aligned CCA slot structure. In this approach, ICCA and/or defer periods may start at a MCCA slot 1333 boundary and may end at a MCCA slot 1333 boundary.

In this example, the specified defer period 1337*b* may only start at a CCA slot boundary based on the aligned CCA slot structure. Thus, if the time is within a MCCA slot 1333 when the channel becomes idle again after a detected busy transmission 1339, the MCCA slot 1333 is considered as busy and excluded from the specified defer period 1337*b*.

Furthermore, the end of the specified defer period 1337*b* may be in the middle of a MCCA slot 1333 based on the CCA slot alignment structure. In this case, the time of the defer period is extended to the end of the MCCA slot. Thus, the actual defer period 1337*a* length may be longer than the specified value. Backoff may resume after the actual defer period 1337*a*.

It should be noted that while the actual defer period 1337*a* was discussed in FIG. 13, the same approach may be applied to determine an actual ICCA length.

FIG. 14 illustrates an example of frame based equipment (FBE) channel access. The subframes 1445 for LAA cell 1 1429*a*, LAA cell 2 1429*b* and LAA cell 3 1429*c* are depicted. The LAA cells 1429 in FIG. 14 have different patterns. Two of the LAA cells 1429 have the same starting subframe 1445 but different ending positions. LAA cell 1 1429*a* starts FBE transmission in subframe #2 and ends in subframe #5. LAA cell 2 1429*b* starts FBE transmission in subframe #2 and ends in subframe #4. LAA cell 3 1429*c* starts FBE transmission in subframe #4 and ends in subframe #7.

For FBE channel access, the LAA transmission always starts at a subframe boundary. To avoid collision with ongoing unlicensed transmission, CCA detection 1449 and LBT should be performed immediately before the subframe boundary. To avoid potential interruption of an ongoing WiFi packet exchange, the CCA 1449 should be performed at least in an initial CCA slot (i.e., an ICCA slot should be used before the allowed LAA transmission period). This may be applied to both UL and DL LAA transmissions. In this example, LAA cell 1 1429*a* performs CCA 1449*a*, LAA cell 2 1429*b* performs CCA 1449*b* and LAA cell 3 1429*c* performs CCA 1449*c*.

FIG. 15 illustrates an example of frame based equipment (FBE) CCA slot alignment. In this example, both LBE and FBE access methods are configured for LAA cells. The LBE CAA slot structure 1553 is maintained. MCCA 1533 is aligned at the end of the subframe at the subframe boundary 1543. The FBE CCA slot is adjusted and extended to the closest CCA slot boundaries based on LBE CCA structure 1553.

An ICCA slot may be used for listen-before-talk (LBT) before a subframe is allowed for transmission. In this case, the specified ICCA for FBE 1535*b* falls in the middle of a MCCA slot 1533. The time of the ICCA is extended to the beginning of the MCCA slot for the actual ICCA length for FBE 1535*a*.

FIG. 16 illustrates another example of frame based equipment (FBE) CCA slot alignment. In this example, both LBE and FBE access methods are configured for the LAA cells, as in FIG. 15. However, in this example, the FBE LAA slot structure is maintained.

The specified ICCA for FBE is aligned at the end of a subframe at the subframe boundary 1643. The LBE CCA slot 1635*a* is adjusted to the specified ICCA for FBE 1635*b* so that an ICCA is included before a subframe allowed for LBE transmission. Then, MCCA 1633 slots are aligned for the LBE CCA slot structure 1653.

Figure 17:
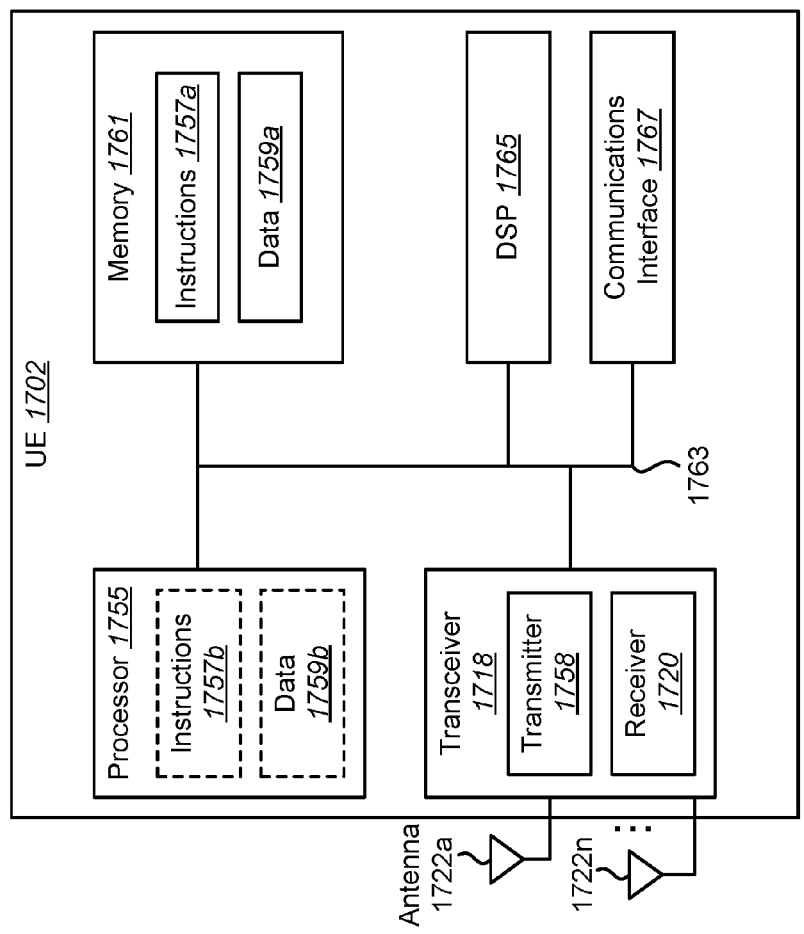
FIG. 17 illustrates various components that may be utilized in a UE.

FIG. 17 illustrates various components that may be utilized in a UE 1702. The UE 1702 described in connection with FIG. 17 may be implemented in accordance with the UE 102 described in connection with FIG. 1. The UE 1702 includes a processor 1755 that controls operation of the UE 1702. The processor 1755 may also be referred to as a central processing unit (CPU). Memory 1761, which may include read-only memory (ROM), random access memory (RAM), a combination of the two or any type of device that may store information, provides instructions 1757*a* and data 1759*a* to the processor 1755. A portion of the memory 1761 may also include non-volatile random access memory (NVRAM). Instructions 1757*b* and data 1759*b* may also reside in the processor 1755. Instructions 1757*b* and/or data 1759*b* loaded into the processor 1755 may also include instructions 1757*a* and/or data 1759*a* from memory 1761 that were loaded for execution or processing by the processor 1755.

The UE 1702 may also include a housing that contains one or more transmitters 1758 and one or more receivers 1720 to allow transmission and reception of data. The transmitter(s) 1758 and receiver(s) 1720 may be combined into one or more transceivers 1718. One or more antennas 1722*a-n* are attached to the housing and electrically coupled to the transceiver 1718.

The various components of the UE 1702 are coupled together by a bus system 1763, which may include a power bus, a control signal bus and a status signal bus, in addition to a data bus. However, for the sake of clarity, the various buses are illustrated in FIG. 17 as the bus system 1763. The UE 1702 may also include a digital signal processor (DSP) 1765 for use in processing signals. The UE 1702 may also include a communications interface 1767 that provides user access to the functions of the UE 1702. The UE 1702 illustrated in FIG. 17 is a functional block diagram rather than a listing of specific components.

Figure 18:
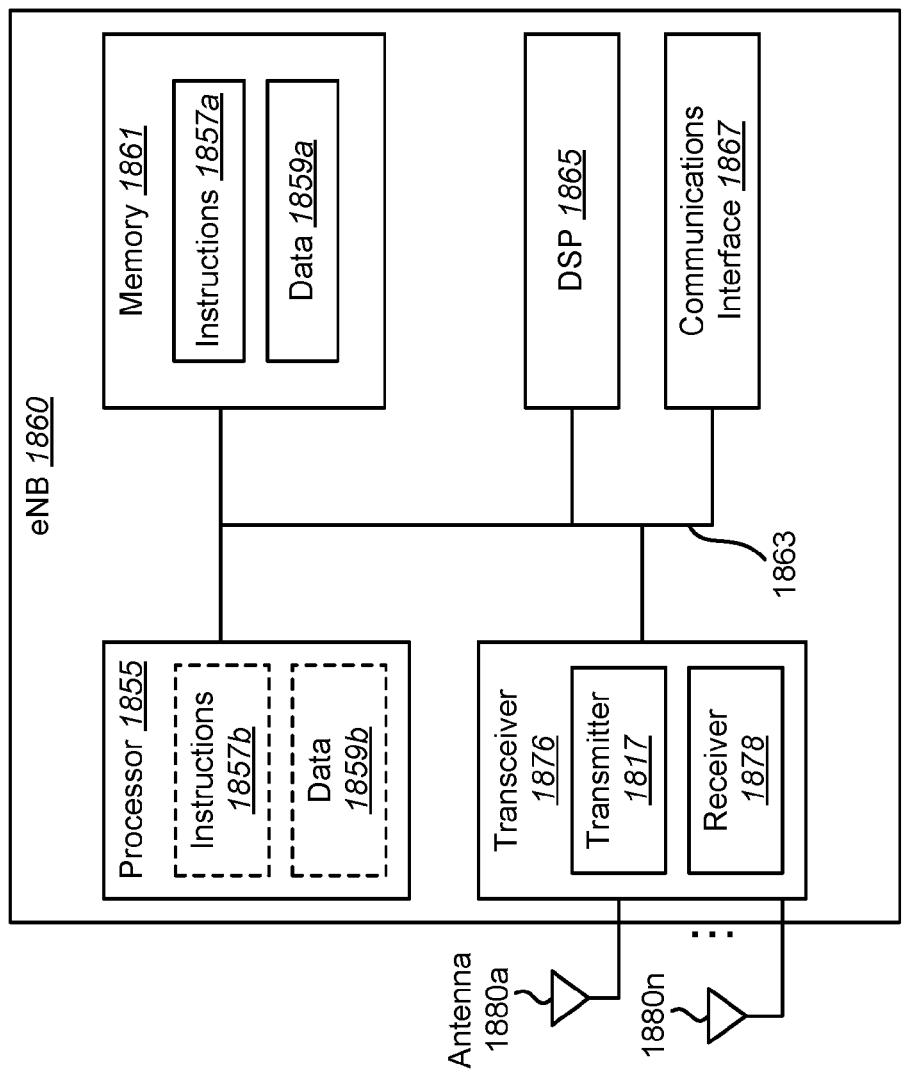
FIG. 18 illustrates various components that may be utilized in an eNB.

FIG. 18 illustrates various components that may be utilized in an eNB 1860. The eNB 1860 described in connection with FIG. 18 may be implemented in accordance with the eNB 160 described in connection with FIG. 1. The eNB 1860 includes a processor 1855 that controls operation of the eNB 1860. The processor 1855 may also be referred to as a central processing unit (CPU). Memory 1861, which may include read-only memory (ROM), random access memory (RAM), a combination of the two or any type of device that may store information, provides instructions 1857a and data 1859a to the processor 1855. A portion of the memory 1861 may also include non-volatile random access memory (NVRAM). Instructions 1857b and data 1859b may also reside in the processor 1855. Instructions 1857b and/or data 1859b loaded into the processor 1855 may also include instructions 1857a and/or data 1859a from memory 1861 that were loaded for execution or processing by the processor 1855.

The eNB 1860 may also include a housing that contains one or more transmitters 1817 and one or more receivers 1878 to allow transmission and reception of data. The transmitter(s) 1817 and receiver(s) 1878 may be combined into one or more transceivers 1876. One or more antennas 1880a-n are attached to the housing and electrically coupled to the transceiver 1876.

The various components of the eNB 1860 are coupled together by a bus system 1863, which may include a power bus, a control signal bus and a status signal bus, in addition to a data bus. However, for the sake of clarity, the various buses are illustrated in FIG. 18 as the bus system 1863. The eNB 1860 may also include a digital signal processor (DSP) 1865 for use in processing signals. The eNB 1860 may also include a communications interface 1867 that provides user access to the functions of the eNB 1860. The eNB 1860 illustrated in FIG. 18 is a functional block diagram rather than a listing of specific components.

Figure 19:
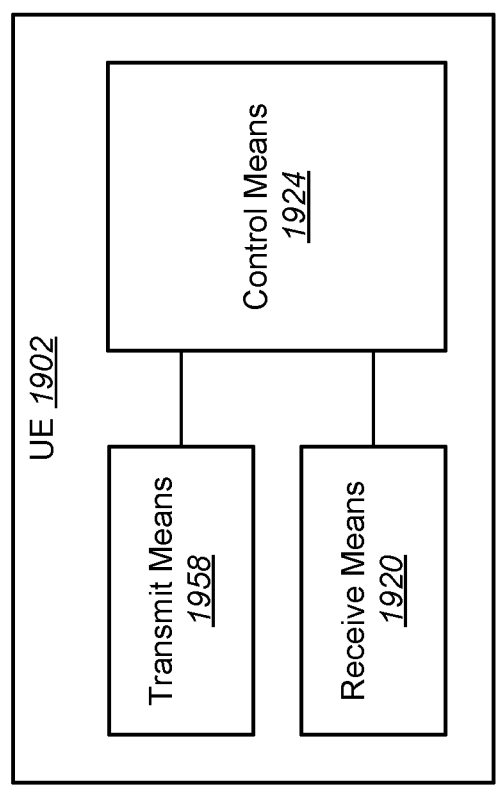
FIG. 19 is a block diagram illustrating one implementation of a UE in which systems and methods for performing LAA may be implemented.

FIG. 19 is a block diagram illustrating one implementation of a UE 1902 in which systems and methods for performing LAA may be implemented. The UE 1902 includes transmit means 1958, receive means 1920 and control means 1924. The transmit means 1958, receive means 1920 and control means 1924 may be configured to perform one or more of the functions described in connection with FIG. 1 above. FIG. 17 above illustrates one example of a concrete apparatus structure of FIG. 19. Other various structures may be implemented to realize one or more of the functions of FIG. 1. For example, a DSP may be realized by software.

Figure 20:
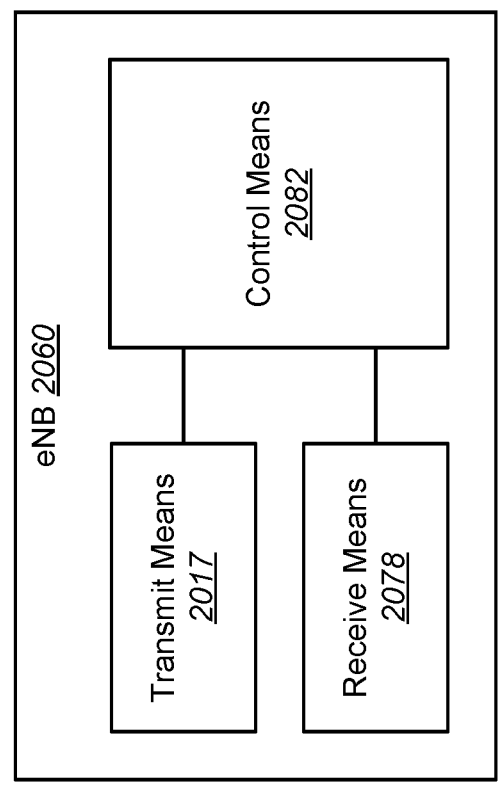
FIG. 20 is a block diagram illustrating one implementation of an eNB in which systems and methods for performing LAA may be implemented.

FIG. 20 is a block diagram illustrating one implementation of an eNB 2060 in which systems and methods for performing LAA may be implemented. The eNB 2060 includes transmit means 2017, receive means 2078 and control means 2082. The transmit means 2017, receive means 2078 and control means 2082 may be configured to perform one or more of the functions described in connection with FIG. 1 above. FIG. 18 above illustrates one example of a concrete apparatus structure of FIG. 20. Other various structures may be implemented to realize one or more of the functions of FIG. 1. For example, a DSP may be realized by software.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

A program running on the eNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the function according to the described systems and methods described above is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the eNB 160 and the UE 102 according to the systems and methods described above may be realized as an LSI that is a typical integrated circuit. Each functional block of the eNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

What is claimed is:

1. An evolved NodeB (eNB) for transmitting signals in a Licensed-Assisted Access (LAA) serving cell, comprising:
    a processor; and
    a memory in electronic communication with the processor, wherein instructions stored in the memory are executable by the processor to:
    configure one or more unlicensed LAA cell from a licensed long term evolution (LTE) cell;
    determine sizes for at least one of a minimum clear channel assessment (MCCA) slot, an initial clear channel assessment (ICCA) slot and a defer period,
    wherein the MCCA slot is synchronized and has a size that is a fraction of an orthogonal frequency division multiplexing (OFDM) symbol length, and lengths of the ICCA slot and defer period are multiples of a length of the MCCA slot,
    wherein the length of the MCCA slot is ⅛ of a Long Term Evolution (LTE) OFDM symbol, and the length of the ICCA slot is ½ of an LTE OFDM symbol;
    determine a slot structure with a baseline MCCA slot of an unlicensed LAA cell;
    align and adjust a length of at least one of the ICCA slot and the defer period of the LAA cell based on the baseline MCCA slot; and
    synchronize and align baseline MCCA slots of multiple LAA cells managed by the eNB.

2. The eNB of claim 1, wherein the slot structure of all LAA cells are synchronized and aligned with the MCCA slot as a fraction of an OFDM symbol.

3. The eNB of claim 1, wherein the length of the defer period is the same as the ICCA slot.

4. The eNB of claim 1, wherein the length of the defer period is at least the length of the ICCA slot, and is calculated based on the access category of the packet or traffic to be transmitted.

5. The eNB of claim 1, wherein the MCCA slot and ICCA slot size are specified with a fixed length that cannot be divided by the length of an OFDM symbol.

6. The eNB of claim 5, wherein the slot structure of a LAA cell is synchronized and aligned with the MCCA slot with a possible merged slot that is longer than the MCCA slot.

7. The eNB of claim 6, wherein the alignment is performed from the end of an OFDM symbol boundary, and the possible merged slot is located at the beginning of an OFDM symbol length.

8. The eNB of claim 6, wherein the alignment is performed from a beginning of an OFDM symbol boundary, and the possible merged slot is located at an end of an OFDM symbol length.

9. The eNB of claim 6, wherein the alignment is performed from the end of a subframe boundary, and the possible merged slot is located at the beginning of a subframe length.

10. The eNB of claim 6, wherein the alignment is performed from the beginning of a subframe boundary, and the possible merged slot is located at the end of a subframe length.

11. The eNB of claim 6, wherein an actual length of at least one of the ICCA slot and the defer period is adjusted and expended according to the baseline MCCA slot structure.

12. The eNB of claim 1, wherein a frame based equipment (FBE) access method is configured for a LAA cell, and the ICCA slot is used for listen-before-talk (LBT) before a subframe allowed for transmission.

13. The eNB of claim 1, wherein an FBE access method is configured for a LAA cell, and the defer period is used for LBT before a subframe allowed for transmission based on the access category of the pending packet or traffic.

14. The eNB of claim 1, wherein both load based equipment (LBE) and FBE access methods are configured for the LAA cells, and the ICCA slot used for LBT before a subframe allowed for transmission for a FBE LAA cell is adjusted based on the CCA slot structure of LBE LAA cells.

15. The eNB of claim 1, wherein both LBE and FBE access methods are configured for the LAA cells, and the CCA slot structure of LBE LAA cells are adjusted with the initial CCA slot used for LBT before a subframe allowed for transmission for a FBE LAA cell.

16. The eNB of claim 1, wherein the CCA slot structure and alignment method are specified or signaled to LAA UEs by higher layer signaling.

17. The eNB of claim 1, wherein the CCA slot structure and alignment method are applied for LAA downlink transmissions.

18. The eNB of claim 1, wherein the CCA slot structure and alignment method are applied for LAA uplink transmissions.

* * * * *